Sept. 5, 1967　　　J. M. MAXWELL ETAL　　　3,339,341
FLUID SEPARATION PROCESS AND APPARATUS
Filed Dec. 22, 1965　　　　　　　　　　　　10 Sheets-Sheet 1
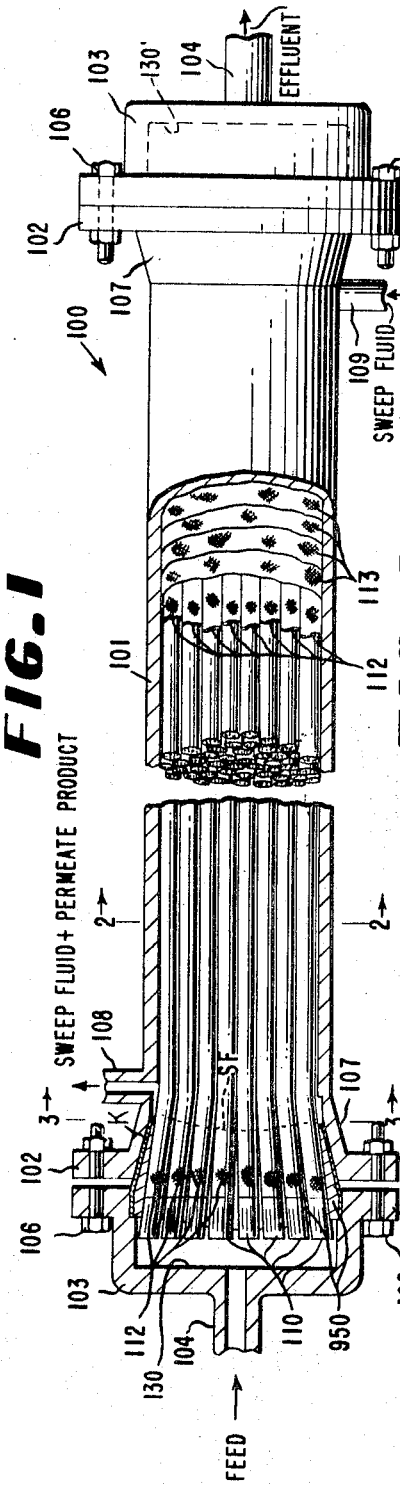
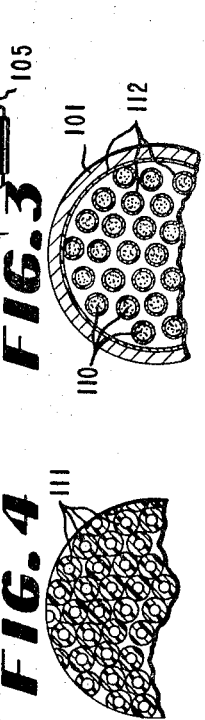
INVENTORS
JOHN MURDOCK MAXWELL
WILLIAM EVERETT MOORE
RICHARD DONALD REGO
BY *Harry E. Braddock*
ATTORNEY

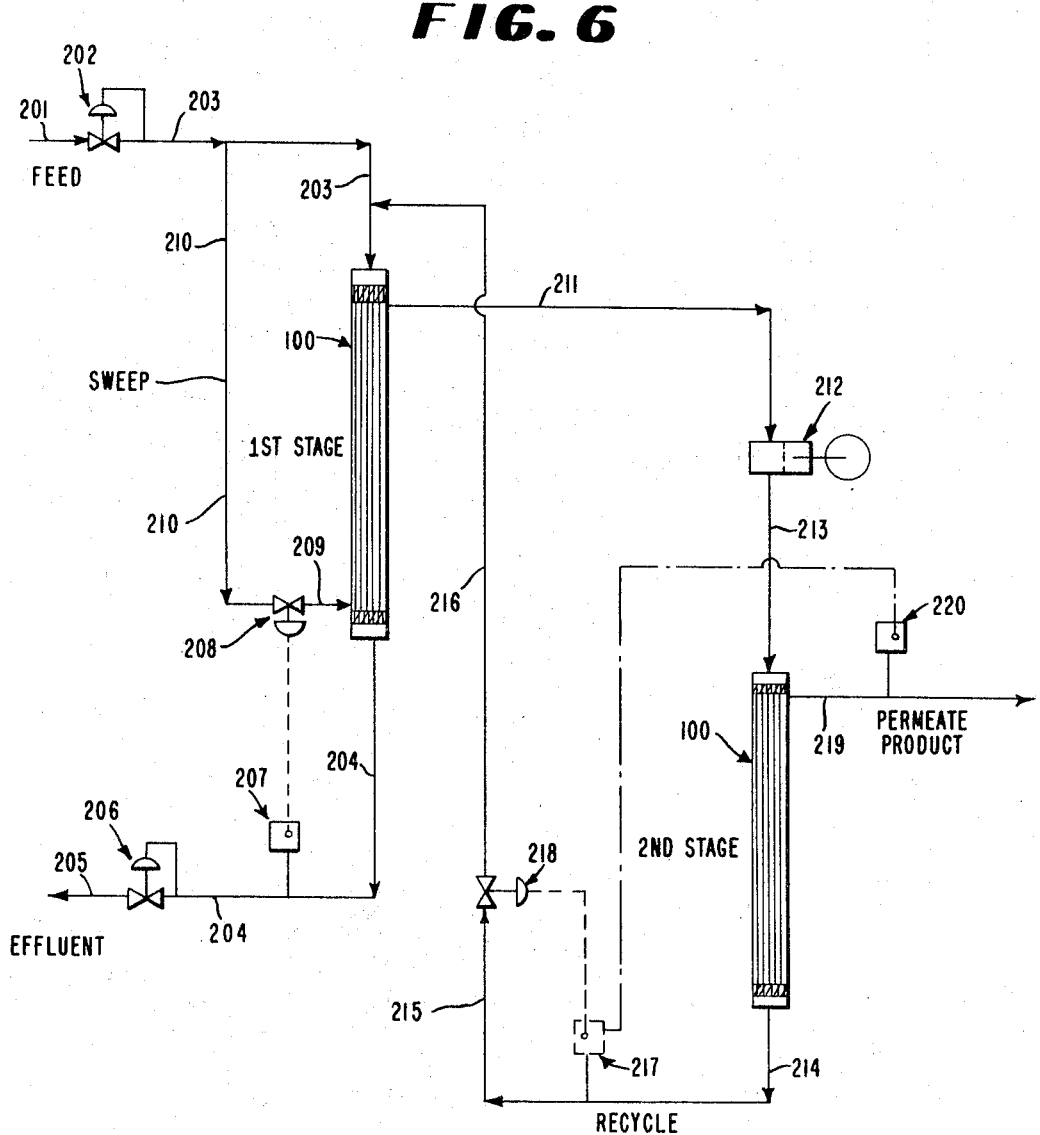

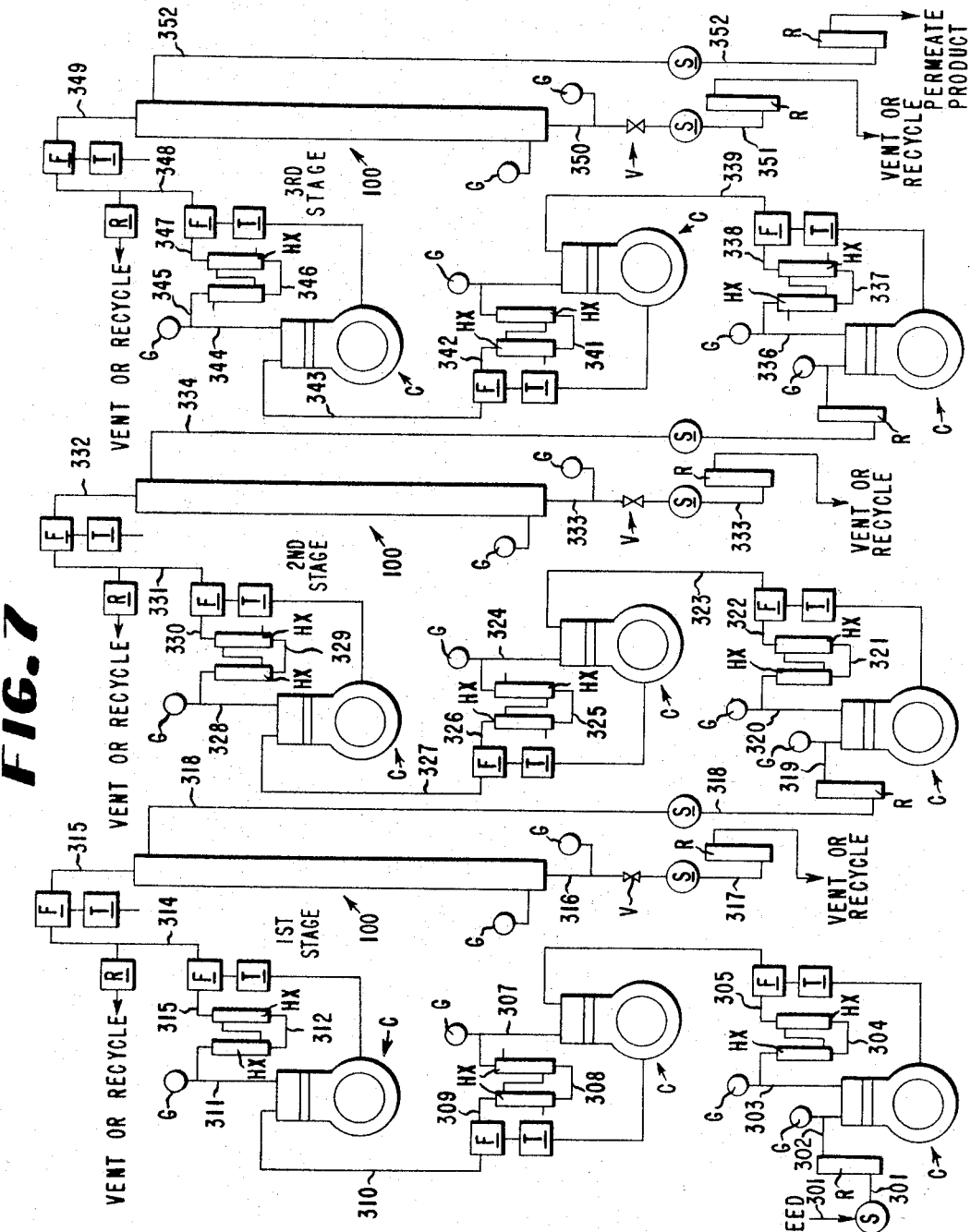

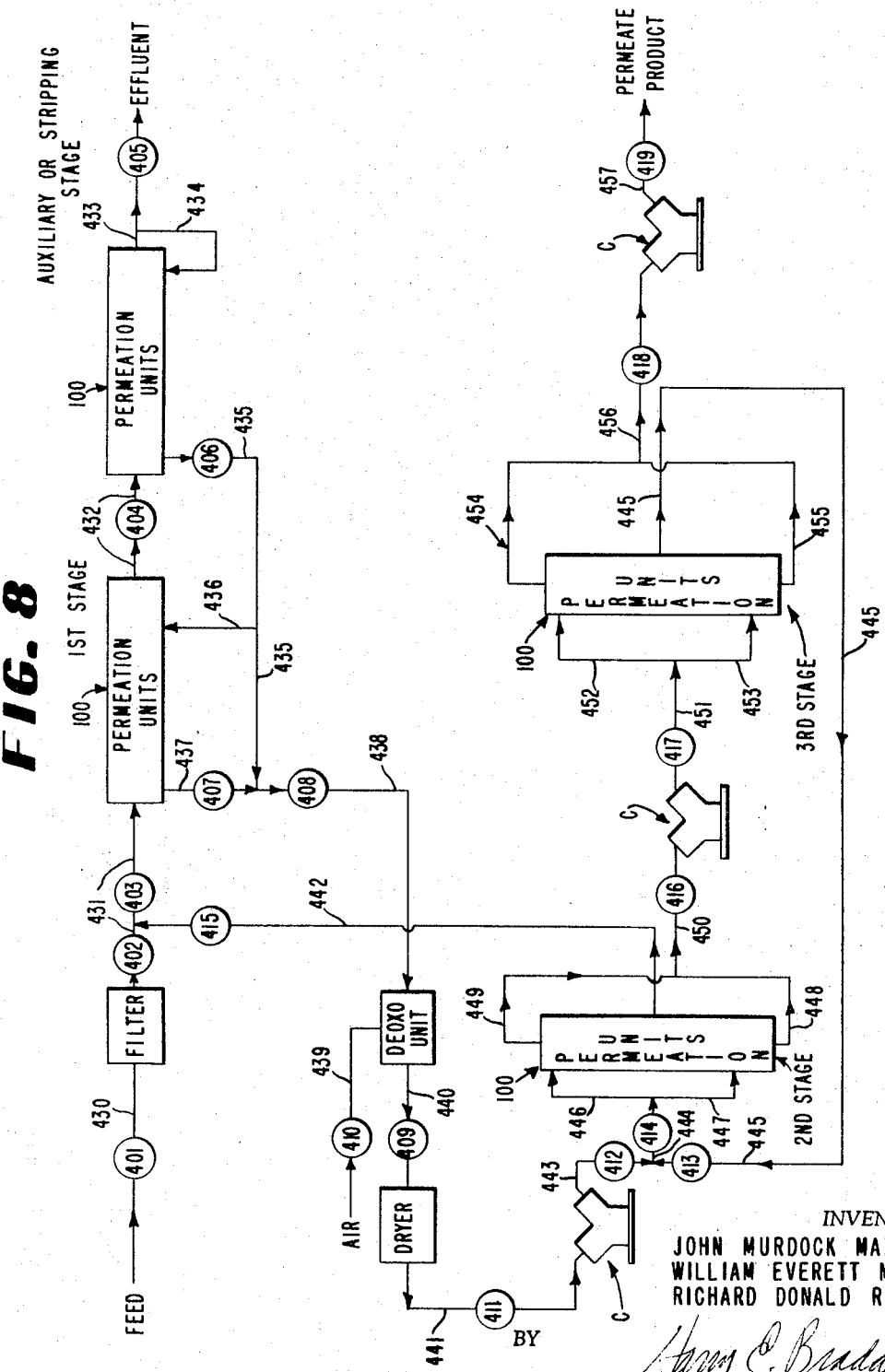

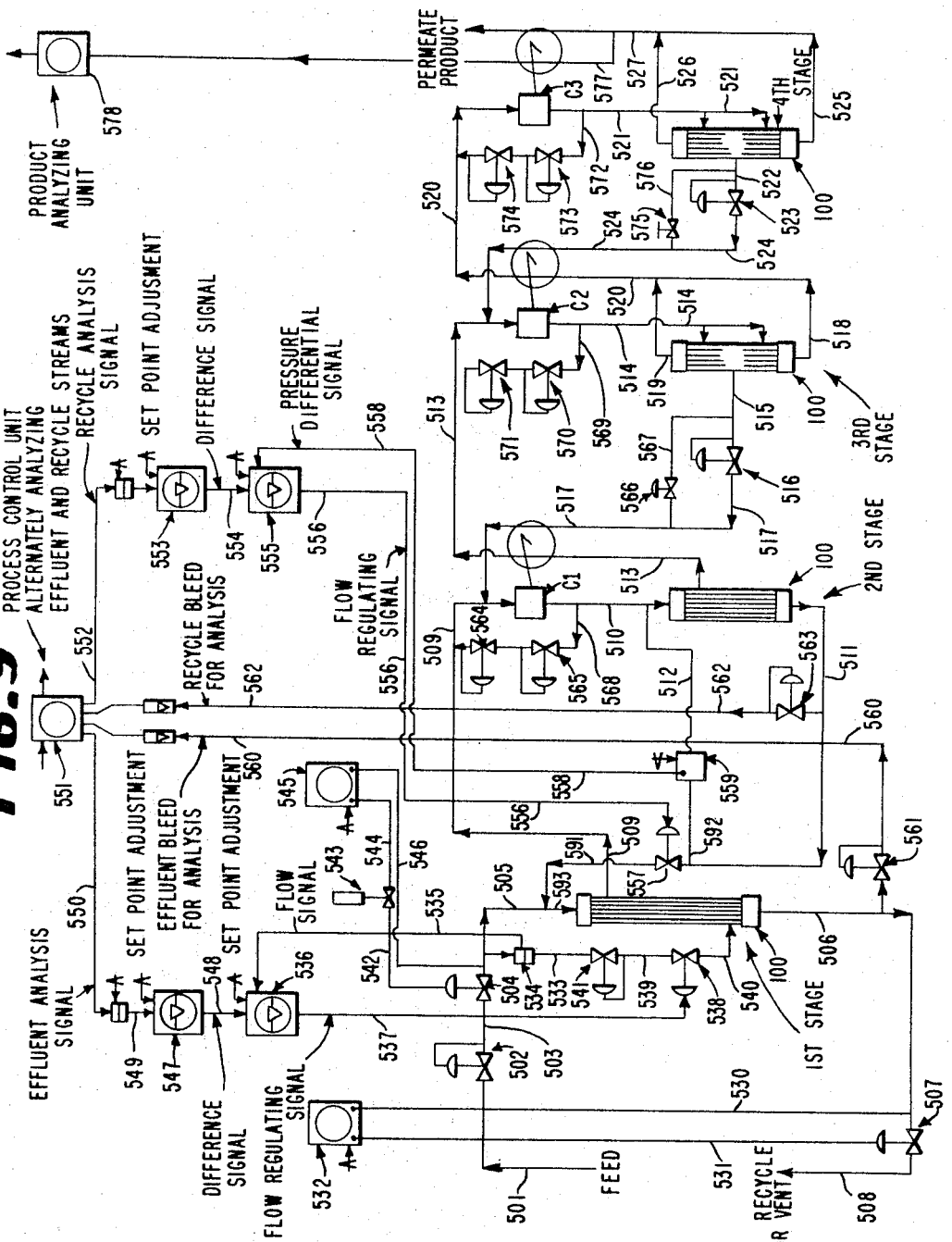

Sept. 5, 1967　　　J. M. MAXWELL ETAL　　　3,339,341
FLUID SEPARATION PROCESS AND APPARATUS
Filed Dec. 22, 1965　　　　　　　　　　　　10 Sheets-Sheet 7
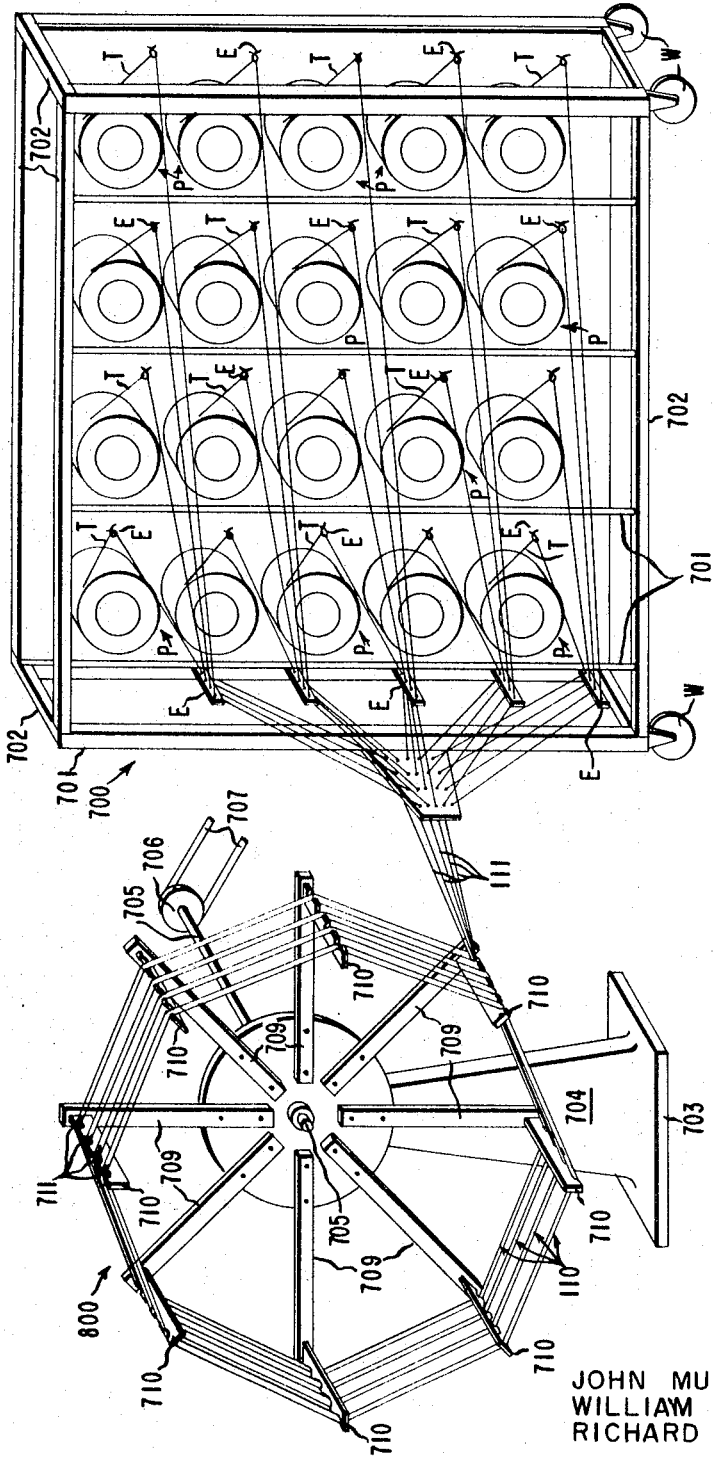
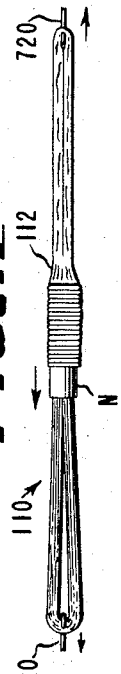
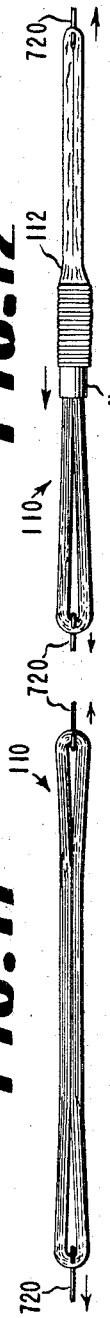
INVENTORS
JOHN MURDOCK MAXWELL
WILLIAM EVERETT MOORE
RICHARD DONALD REGO
BY
ATTORNEY

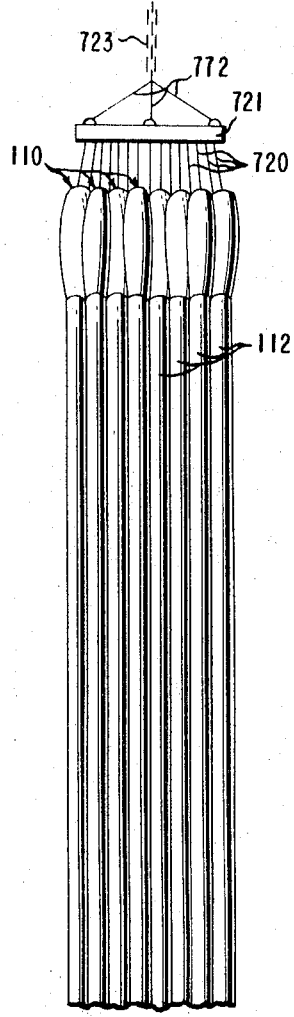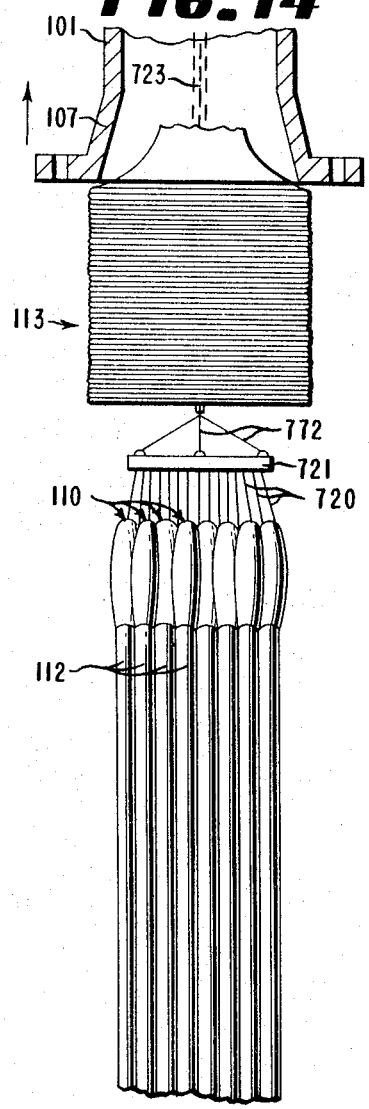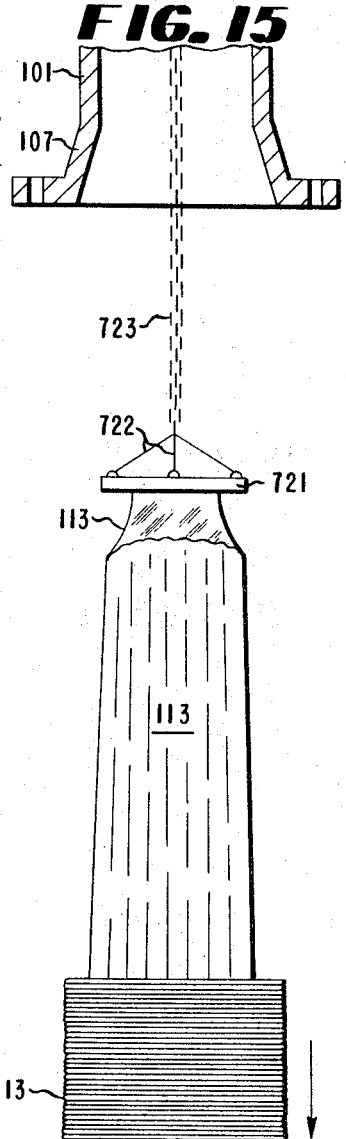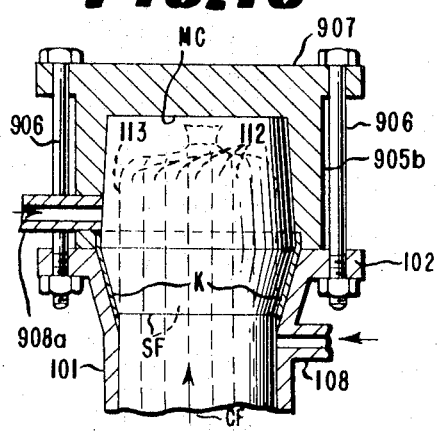

Sept. 5, 1967  J. M. MAXWELL ETAL  3,339,341
FLUID SEPARATION PROCESS AND APPARATUS
Filed Dec. 22, 1965  10 Sheets-Sheet 9

INVENTORS
JOHN MURDOCK MAXWELL
WILLIAM EVERETT MOORE
RICHARD DONALD REGO

BY
ATTORNEY

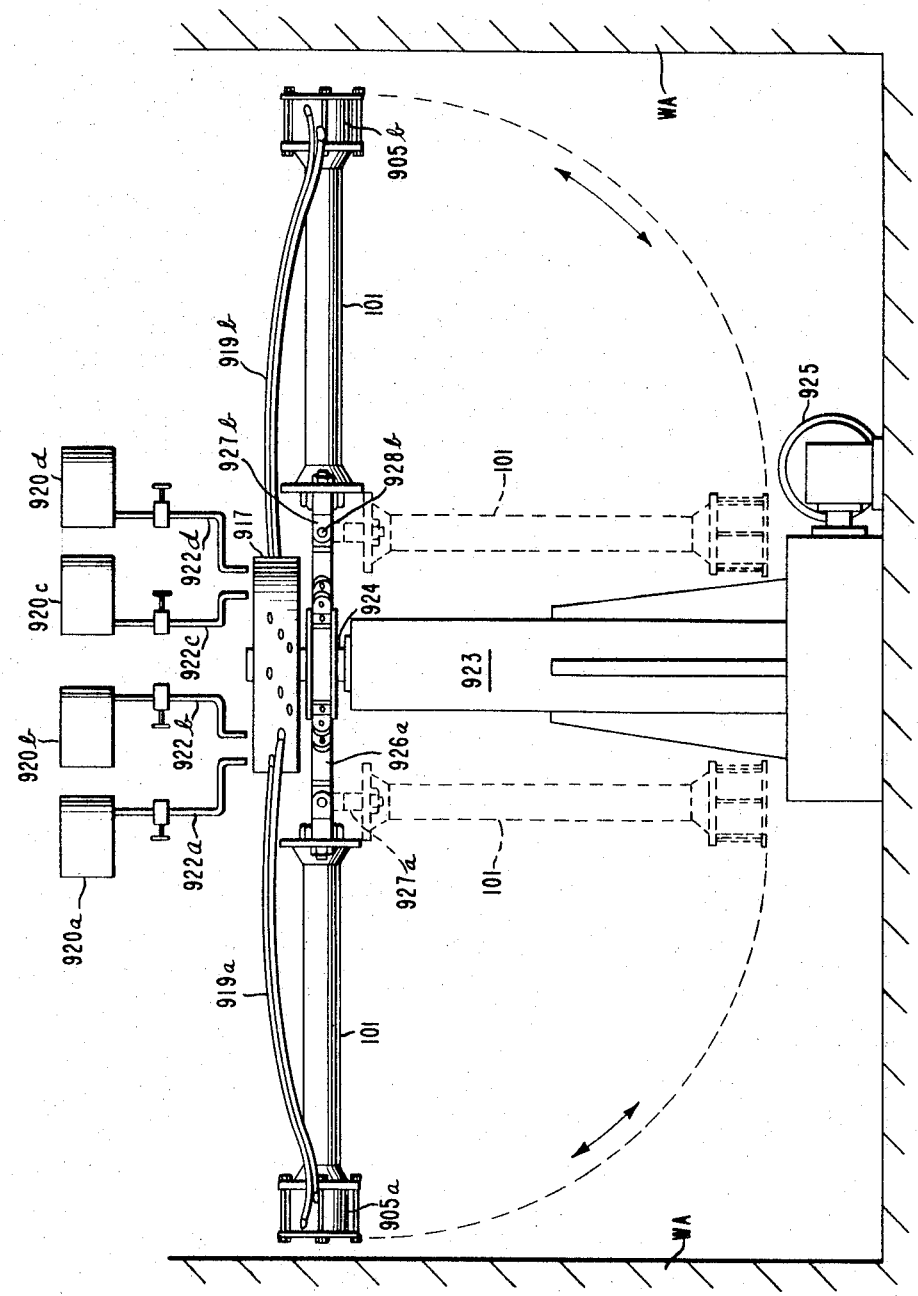

United States Patent Office 3,339,341
Patented Sept. 5, 1967

3,339,341
FLUID SEPARATION PROCESS AND APPARATUS
John Murdock Maxwell, Glen Farms, Md., and William Everett Moore and Richard Donald Rego, Wilmington, Del., assignors to E. I. du Pont de Nemours and Company, Wilmington, Del., a corporation of Delaware
Filed Dec. 22, 1965, Ser. No. 515,621
34 Claims. (Cl. 55—16)

This invention relates generally to the field of separating fluids by utilizing their different permeation rates through membrane elements in the form of small hollow filaments made of organic polymeric compositions. More specifically, the invention involves new and improved separation apparatus with new and improved methods of operation. Also involved are novel and improved apparatus and process arrangements for the production or fabrication of the fluid separation apparatus of the invention.

Fluid separation appartus and methods utilizing hollow filaments of polymeric compositions have been disclosed in the prior art. However, careful examination of such disclosures indicates that the apparatus and process arrangements represented experimental or inefficient, impractical embodiments of the early ideas in this field. In addition, such prior art arrangements were of such designs and possessed features which would not lend themselves either to effective commercial operation or to practical, reliable commercial manufacturing techniques.

It is one general object of this invention to provide new and improved fluid separation apparatus and processes for many fluid separations which overcome the deficiencies and disadvantages of the prior art arrangements especially with respect to efficient, flexible, and reliable commercial operation, and also with respect to simple, direct, and economical designs and practical commercial manufacturing techniques.

It is an additional general object of the invention to provide such new and improved apparatus which utilizes new and improved commercial manufacturing procedures and equipment.

The means and methods by which the objects of the invention are achieved, as well as additional objects and advantages thereof will be apparent from a consideration of the following specification and claims taken in conjunction with the accompanying drawings in which:

FIGURE 1 is a partial longitudinal sectional view of the fluid separation unit of this invention with parts broken away to show the details of its construction.

FIGURE 2 is a partial transverse cross-sectional view taken at line 2—2 of FIGURE 1.

FIGURE 2a is an enlarged view of a portion of the showing of FIGURE 2 to show the filament group cross-sections in greater detail.

FIGURE 3 is a partial transverse cross-sectional view taken at line 3—3 of FIGURE 1.

FIGURE 4 is a partial greatly enlarged transverse cross-sectional view of an indicated portion of a group of hollow filaments of the unit shown in FIGURE 2.

FIGURES 5a, 5b, 5c, and 5d are partial showings of illustrative porous sheath members used to surround and constrain the filaments in the groups and bundles.

FIGURE 6 is a schematic diagrammatic showing of a two stage permeation separation system or arrangement utilizing permeation separation units of the type shown in FIGURE 1.

FIGURE 7 is a schematic diagrammatic showing of a three stage permeation separation system or arrangement utilizing permeation separation units of the type shown in FIGURE 1.

FIGURE 8 is a schematic diagrammatic showing of a modified three stage permeation separation system or arrangement utilizing permeation separation units of the type shown in FIGURE 1.

FIGURE 9 is a schematic diagrammatic showing of a four stage permeation separation system or arrangement utilizing permeation separation units of the type shown in FIGURE 1.

Figure 9A:
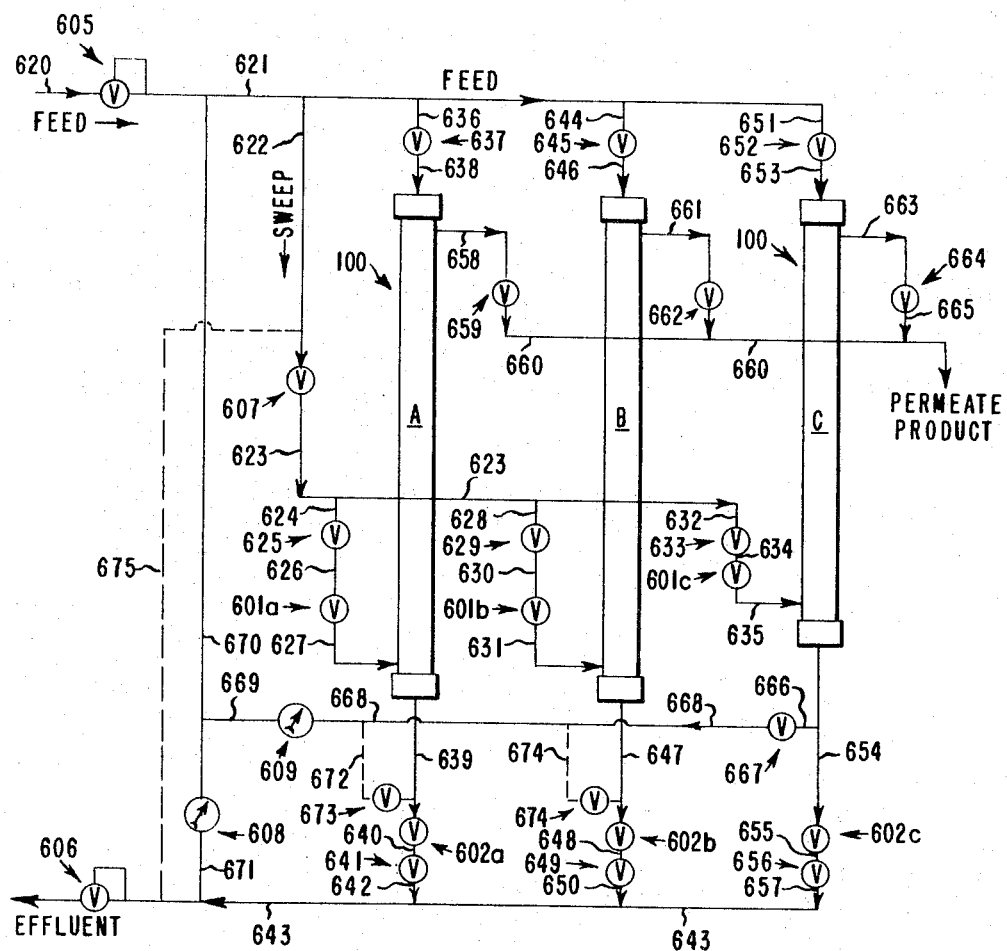

FIGURE 9a is a schematic diagrammatic showing of a preferred arrangement of a plurality of fluid separation units in one stage of a fluid separation system embodying principles of the present invention.

FIGURE 10 is a general somewhat schematic perspective view of an apparatus arrangement for forming individual groups of small filaments in the form of hanks, bundles or loops of continuous hollow filaments.

FIGURE 11 is a simple side elevational view of a single hank or loop of continuous hollow filaments in elongated flattened configuration which forms a group or sub-bundle for eventual assembly in the permeation separator unit embodying principles of this invention.

FIGURE 12 is a simple side elevational view showing a single hank or loop of continuous hollow filaments in elongated flattened configuration being encased in and radially constrained by an elongated porous sheath member to make an encased group or bundle.

FIGURE 13 is a partial side elevational view showing a plurality of groups or sub-bundles of hollow filaments, each encased in its porous sheath member, being assembled to form the larger bundle before positioning of the larger bundle in the casing of a permeation separator unit of the invention.

FIGURE 14 is a partial elevational view of a bundle of assembled groups of sheath encased hollow filaments in position for movement into the unit casing after the final porous sheath member or members is positioned around the assembled bundle.

FIGURE 15 is a view similar to FIGURE 14 showing a final porous sheath member being positioned on a bundle of assembled filament groups to radially constrain the same to dimensions which permit positioning of the assembled bundle in the unit casing.

FIGURE 16 is a partial longitudinal sectional view of a bundle of assembled filament groups in position in the unit casing with a mold assembly operatively mounted on the casing for formation of a cast end closure member for the unit casing.

Figure 17:
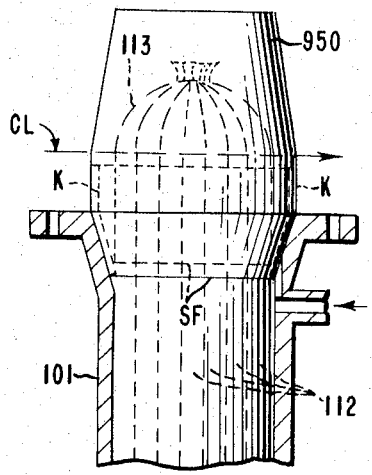

FIGURE 17 is a view similar to FIGURE 16 showing the completed cast end closure member positioned in the unit casing with the mold assembly removed and before the unwanted excess portions of the cast end closure member is cut away.

Figure 18:
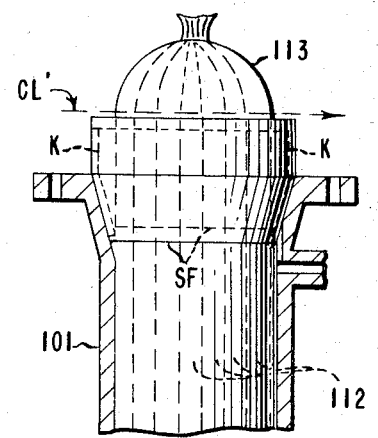

FIGURE 18 is a view similar to FIGURE 17 of a completed modified cast end closure member positioned in unit casing as in FIGURE 17, the cast end closure member being the type formed against a radially outwardly positioned layer of heavy immiscible liquid in the mold assembly during centrifuging in order to maintain the ends of the bundle of filaments free of the cast material.

Figure 19:
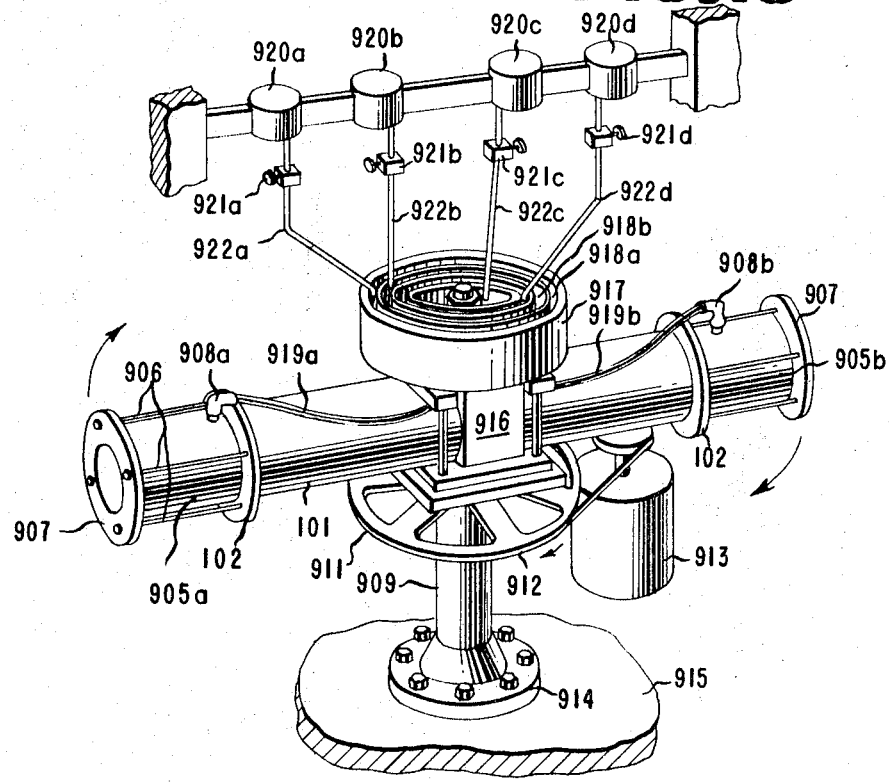

FIGURE 19 is a partial perspective view of a centrifuging apparatus used in forming the cast end closure member for the permeator separator unit casing, showing a casing and cooperating mold assemblies in operative engagement with the centrifuging apparatus.

FIGURE 20 is a partial side elevational view of a modified version of the centrifuging apparatus shown in FIGURE 19 showing a plurality of unit casings in position for formation of one of their cast end closure members.

A basic unit of fluid separation apparatus representing a preferred embodiment of the invention is shown in FIGURES 1, 2, 3, and 4 of the drawings. Generally speaking, this apparatus depends, for its operation, on the selective passage of gases and liquids through nonporous membrane elements by permeation or activated diffusion. Such passage is usually pictured as involving solution of gaseous or liquid material into one surface of a solid nonporous membrane element, migration of the material through the membrane element under the influence of a difference in concentration or pressure, and emergence of the material from another surface of the membrane element. Separation is obtained when different components of a fluid mixture pass through the non-porous membrane element at different rates. This type of separation involving differential permeation has been achieved, according to the known prior art, in membrane elements of platinum, palladium and their alloys; in membrane elements of silica and certain glasses; and also in membrane units of various polymeric materials.

The preferred apparatus shown in FIGURES 1–4 comprises an elongated fluid-tight tubular casing assembly 101 formed of a suitable material such as steel. Tubular casing assembly 101 is preferable open at both ends. Both ends are provided with flange elements 102 and outwardly tapered portions 107. In addition the tubular casing assembly is provided with inlet and outlet means 108 and 109 to provide for movement of fluid into and out of the assembly. Preferably, means 108 and 109 communicate with the enlarged interior portion of the tubular assembly formed by tapered portions 107. A plurality of very small hollow filaments 111, of polymeric composition, such as polyethylene terephthalate for example, are positioned inside the tubular casing assembly 101 in a relatively close-packed relationship. As shown in FIGURES 1–4 the plurality of filaments 111 comprises a number of substantially equal groups 110 of filaments each group firmly peripherally constrained by an elongated flexible porous sleeve member 112 extending longitudinally of the filaments and the groups. In addition, the groups 110 of filaments each surrounded by their porous sleeve members are all surrounded by at least one overall elongated flexible porous sleeve member 113 as shown. The detailed construction and functioning of these sleeve members will be discussed at a later point in this specification. Each end of the tubular casing assembly 101 is closed by a fluid-tight cast wall member 950 preferably formed of polymeric composition, such as an epoxy resin, for example. The hollow filaments, substantially parallel to each other and to the axis of the tubular casing assembly, extend between the cast wall members 950. The hollow filaments have open end portions which are embedded in and extend through the cast wall members in fluid-tight relation thereto. The tubular casing assembly 101 is further provided at each end with outer closure members 103 which cooperate with the tubular casing assembly 101 and the cast wall members 950 to define a closed chamber 130 in communication with the interior portions of the hollow filaments. Each chamber 130 is provided with conduit means 104 to permit movement of fluid between each chamber and a point outside the chamber. The outer closure members 103 are provided with flanges 105 which are secured to the flanges 102 of the tubular casing assembly by means of belts 106. In the preferred embodiment shown, an annular resilient gasket K of suitable material such as rubber or neoprene is provided between the cast wall members 950 and the tubular casing assembly 101 and between the cast wall members and outer closure members 103 to improve the fluid-tight sealing action. The outer closure members 103 are formed of a suitable material such as steel, for example.

As shown in FIGURE 2, the sleeve-encased groups 110 of filaments 111 positioned in the main portion of the tubular casing assembly between the tapered portions 107 are relatively closely packed. The flexible constraining nature of the porous sleeve members 112 maintains the filaments in each group in a compact cross section while permitting each group to yieldably engage the other groups and the inside of the tubular casing assembly, in order to accommodate where necessary the cross sectional deformations necessary to achieve a packing condition of a higher degree than could be obtained by groups of rigid circular transverse cross sections. This is best shown in FIGURE 2a. The filament groups and the filaments themselves engage each other, and the casing assembly, laterally in a number of elongated areas or lines extending along the length of the groups and filaments (FIGURES 2, 2a, and 4). These elongated areas define between the groups, between the filaments, and between the groups and the interior of the casing assembly, a plurality of transversely evenly distributed elongated passageways extending along the length of the filaments and the tubular casing assembly. These passageways have very little lateral communication, and force circulation of fluid in the casing assembly and outside the hollow filaments to move substantially longitudinally along the filaments and the interior portion of the tubular casing assembly between the tapered portions 107.

A postional relationship of the filament groups adjacent their ends and resulting from the tapered portion 107 of the tubular casing assembly, is shown in FIGURE 3. It will be seen in this figure that the enlarged interior cross section at the tapered portion 107 reduces the packing density of the filament groups and increases the spacing between them to permit improved distribution and collection of fluid between the inlet and outlet means 108, 109 and the elongated passageways between the adjacent filaments, and groups of filaments.

The interior tapered end portion 107 of each end of the tubular casing assembly 101 cooperates with the corresponding tapered portion of the cast wall member 950 to develop a wedging action to help maintain the fluid-tight seal between these parts. A similar action occurs as a result of the engagement between the engaged tapered portions of outer closure member 103 and the cast wall member 950.

An important feature of the apparatus involves the inner face SF of the cast wall members 950. This surface is relatively smooth, continuous, even, and substantially free of sharp deviations in the direction along which the hollow filaments extend. It is important that this configuration be achieved and maintained so that a fluid-tight seal exists around the hollow filaments without diminishing the effective surface area of the filaments between the cast wall members. In a preferred embodiment of the invention, the inner surface SF of the cast wall members 950 has a concave curved configuration of a right circular cylinder, as shown. This configuration results from the centrifugal casting operation preferably employed to form the cast wall member 950 and which will be described in detail hereinafter.

The hollow filaments 111 may be composed of any polymeric material which is suitable for selective or differential permeation fluid separations. They may be made of olefin, ester, amide silicone, ether, nitrile, or sulfide polymers; or of any other suitable polymer or copolymer. Suitable hollow filaments can be made from polyethylene terephthalate, polyvinyl chloride, polyvinylidene chloride, polyhexamethylene adipamide, copolymers of tetrafluoroethylene and hexafluoropropylene, cellulose acetate, ethyl cellulose, polystyrene, copolymers of butadiene and styrene and many other polymers and copolymers. The filaments may be prepared in any suitable manner, such as by solution spinning or by melt spinning. The hollow polymeric filaments are preferably between about 10 and about 500 microns in outside diameter and preferably have wall thicknesses between about 1 and about 100 microns. Hollow filaments between 20 and 250 microns in outside diameter with wall thicknesses between 2 and 50 microns are especially preferred.

The density of packing of the hollow filaments 111 within the flexible porous sleeve members 112 may for practical purposes be of any convenient value above about 35%, but for optimum results should be as high as practicable. Packing density is defined as the percentage of the cross sectional area which is enclosed within the outer walls of the hollow filaments inside the tubular casing assembly 101. For a housing assembly of circular transverse cross section of inside diameter $D_S$ containing N hollow filaments of circular cross section and outside diameter $D_E$, the packing density is given as follows:

$$\text{Packing density (percent)} = \frac{ND_E^2}{D_S^2} \times 100$$

The packing density defined in this way has a maximum value of 90.5% for circular cross section hollow filaments in a hexagonally close packed arrangement and maximum value of 78.5% for square close packing. Packing densities above 45% inside the flexible porous sleeve members have been achieved without difficulty. Packing densities up to 60% or more can be obtained by maintaining the filaments parallel, surrounding them by a sleeve member, and reducing the peripheral dimension of the sleeve member to compact the filaments contained therein. When groups of sleeve-encased compacted filaments have been bundled and drawn into tubular casing assemblies as shown in the drawings, packing densities of about 55% have been achieved. Overall packing densities above about 40% are preferred in permeation units of the type shown in FIGURES 1–4. These high packing densities do not prevent all movement of fluid into and out of the bundles between the filaments, but they do cause the fluids outside of the hollow filaments in the tubular casing assembly to flow along and in the direction of the filaments in a given group or bundle. This flow condition causes desirable concentration gradients to be established and maintained inside the housing assembly along the hollow filaments when a fluid mixture is passed through the hollow filaments in the housing assembly. This will be discussed in more detail at a subsequent point in the specification.

The flexible porous sleeve members 112, 113 may be made of any suitable material, natural, reconstituted, or synthetic, of suitable strength and compatible with the fluid mixture being handled, the polymer from which the hollow filaments are made, the material forming the cast wall members, and the other materials with which the sleeve will come in contact. The sleeve members may be of any practical construction which is porous and flexible. Preferably the sleeve members should be of a strong abrasion resistant material, or a construction, which is capable of shrinkage or shortening at least in the transverse peripheral dimension to give a uniform constraining compacting action on and along an enclosed bundle or group of filaments. A preferred construction is a circularly knit fabric sleeve of a suitable material such as cotton thread, for example, which sleeve is capable of considerable reduction in transverse peripheral dimension when the sleeve is placed under tension longitudinally. This sleeve is especially advantageous, for when tension is exerted on such a sleeve surrounding a bundle to pull a filament bundle into a tubular casing assembly, the tension also results in uniformly compacting and reducing the bundle cross section along the bundle length to facilitate positioning the bundle in such a casing assembly without flatening or damaging the filaments of the bundle. The sleeve members 113 may also be made of woven, or non-woven fabric, or of punched or cut cylindrical tubes, or tubes of netting as shown in FIGURES 5a, 5b, 5c, and 5d. The ability of the sleeve member to shrink or reduce its radius or circumference uniformly and evenly is highly desirable and important.

The tubular casing assembly may be made with any suitable transverse cross sectional configuration and of any suitable compatible material of sufficient strength. Cylindrical metallic housings, for example; steel pipe, are satisfactory, being reasonably easy to produce and assemble. The size of the tubular casings of the separation apparatus units may vary from less than one inch to many inches in outside diameter, and may vary from a few feet to many feet in length.

An idea of the effective construction and use of hollow filaments in the apparatus of this invention may be indicated by the fact that in a separation apparatus embodying features of this invention and having a tubular casing assembly about six inches in diameter and eight feet long, about twelve million hollow filaments have been packed to give an effective membrane surface area of about 20,000 square feet.

In certain forms of the fluid separation apparatus of this invention, it is desirable to introduce fluid adjacent each end of the tubular casing assembly (see final stage of FIGURE 8) and remove fluid from the assembly at a position intermediate its ends. Under these circumstances, it is desirable to provide an enlarged interior cross section for the assembly at this position intermediate its ends to reduce the packing of the filaments and filament groups for a limited distance to permit lateral flow and collection of fluid from between the filaments and filament groups.

The cast end closure members 950 may be made of any convenient settable or solidifiable material of sufficient strength and compatibility with the other parts of the apparatus. Solders, cements, waxes, adhesives, natural and synthetic resins may be used. This cast wall member material may set or solidify because of freezing or cooling, or because of cooling, or because of chemical reactions which cause polymerization, condensation, oxidation, or other hardening processes. Other desirable properties of the settable or solidifiable material are: a low viscosity in the liquid form to promote easy penetration of filament bundles prior to solidification or setting, a high density to perform better under the centrifugal casting action (to be described in detail hereinafter), absence of gas evolution or similar physical change during solidification, minimum or no change in volume during solidification, and minimum evolution of heat during solidification. Synthetic organic resins are well suited for use as setting materials with the preferred polymeric compositions of the hollow filaments. The preferred materials from which the cast wall members are formed are epoxy resins.

In describing the operation and functioning of the apparatus unit shown in FIGURES 1–4, the description will first be given of the unit operating as first stage unit in a multi-stage system. In use as a first stage unit for the enumerated separations of gases (where the component with the highest permeation rate through the hollow filament walls to be separated from a fluid mixture represents only a small percentage of the mixture), it has been found advantageous to move the initial mixture through the interior of the hollow filaments and collect the permeated fluid from the outside of the hollow filaments. With respect to FIGURE 1, this general procedure is accomplished by bringing the inlet stream of the initial fluid mixture at elevated pressure into chamber 130 at the left hand end of the apparatus, as viewed in FIGURE 1, through conduit means 104. From this chamber 130, the fluid mixture then moves through the interior portions of the hollow filaments of filament groups 110 to a similar chamber 130' at the right hand end of the apparatus as seen in FIGURE 1. With a suitable pressure and/or concentration differential maintained between the inside and outside of the hollow filaments, a fraction of the initial fluid mixture enriched in the component with the highest permeation rate will permeate outwardly through the walls of the hollow filaments into the space between the inside of tubular casing assembly 101 and outside of the hollow filaments. The resulting fluid mixture, or effluent, which reaches the chamber 130', somewhat depleted in the component with the highest permeation rate through the filament walls, is removed through conduit means 104.

The enriched fraction of the initial fluid mixture, or permeate product, which has permeated through the walls of the hollow filaments may then be removed from the interior of tubular casing at a lower pressure relative to that of the inlet stream, through a suitable outlet means such as 108. The preferred mode of operation involves the use of a sweep fluid stream, which may be a portion of the inlet stream at lower pressure, moved into the casing assembly 101 through inlet means 109, along the outside of the hollow filaments in the casing assembly, and out through outlet means 108. Sweep fluid flow in a direction countercurrent to the inlet stream flow is preferred in order to maintain desirable effective concentration gradients. Under these conditions, the close packing of the filaments and groups, which is made possible by the sleeve members 112, 113, together with the resulting longitudinally extending passageways between the filaments and groups, as discussed previously, result in highly efficient evenly distributed fluid flow patterns inside casing assembly 101 and outside the hollow filaments in which flow patterns undesirable back mixing of the fluid outside the hollow filaments, and disturbance of the desirable concentration gradients is kept to a low minimum. In addition, the large amount of effective membrane surface area present per unit volume of the casing assembly in its extremely small thickness, also contributes importantly to the efficient, practical, economically feasible fluid separation rates of this apparatus.

Under conditions in which the fluid mixture component to be separated (with the highest permeation rate through the hollow filament walls) represents a large percentage of the mixture, it has been found desirable to introduce the initial fluid mixture under elevated pressure into the interior of the tubular casing assembly 101 and outside of the hollow filaments through inlet means 109 and remove it as the effluent stream from outlet means 108 in condition depleted of its highest permeation rate component. In this mode of operation, a fraction of the initial fluid mixture enriched in the component with the highest permeation rate will permeate inwardly through the hollow filament walls into the interior of the hollow filaments from which it may be removed at lower pressure through conduit means 104 and/or 104' after being collected in chambers 130 and 130'. It is also desirable in this mode of operation to utilize a sweep fluid moving countercurrently to the flow of the initial fluid mixture, bringing it in through conduit means 104 and removing it and the permeate product through conduit means 104'. This mode of operation has been found advantageous for the final stage apparatus units of a multi-stage gas separation system. However, it is understood that in other applications of the invention, such as water desalinization, or hydrocarbon separations other arrangements may be more advantageous.

Another desirable final stage version involves supplying the inlet fluid mixture into the casing assembly outside the hollow filaments at a point adjacent each end of the assembly and removing the depleted inlet mixture from the casing at a point between the ends of the casing (final stage FIGURE 8). In this version the fluid which permeates into the interior of the hollow filaments is removed simultaneously from both ends of the apparatus (final stage FIGURE 8). It will be noted that this establishes the desirable countercurrent flow of permeated fluid and inlet fluid mixture with its desirable concentration gradients.

With the preferred materials of construction, these apparatus units embodying principles of the invention can be operated satisfactorily at ordinary atmospheric temperatures and at moderate pressure levels, well below 1000 pounds per square inch for example, although the hollow filaments will easily sustain sufficiently high pressure differentials to give commercially required flow rates. The flexible porous sleeve members 112, 113 which surround the groups of filaments not only serve a very useful purpose during assembly of the fluid separation apparatus of the invention but are important as a part of the apparatus combination itself in that they also continue to protect the hollow filaments during operation and function to maintain the lateral, or transverse, compressive stresses substantially evenly distributed throughout the entire bundle of closely packed hollow filaments without flattening or damaging the hollow filaments, even those at the outer periphery of the bundle in contact with the tubular casing assembly walls.

The preferred use of centrifugally cast wall members to close the casing assembly ends and seal around the filaments is believed to be extremely important to the overall apparatus combination in achieving an effective uniform fluid-tight wall and seal between the very small closely packed filaments and between those filaments and the casing assembly, without wicking of the wall material (when in liquid form) between and along the filaments due to capillary action which could cause voids in the wall and would, by coating the filament surfaces, reduce the effective membrane area within the casing assembly for permeation and separation.

The apparatus unit shown in FIGURES 1–4 can be combined in various forms and ways to provide many different multi-unit and multi-stage separation systems if desired or required. A number of such systems are shown in FIGURES 6, 7, 8, 9, and 9a.

FIGURE 6 shows one of the most simple forms of a multi-stage gas separation system embodying features of the invention, a two stage system in which a supply conduit 201 supplies a feed or inlet stream to a pressure regulating valve 202 from which the inlet stream is passed via conduit 203 through the hollow filaments of a first stage separation apparatus unit 100, of the type shown in FIGURE 1. Conduit 204 conducts the depleted stream or effluent which has passed through the hollow filaments of the first stage separation apparatus unit 100 to a pressure regulating valve 206 from which the effluent stream may be vented, recycled, or otherwise disposed of. A conduit 210 carries a portion of the feed inlet stream to control valve 208 from which the stream is passed into the casing assembly of the first stage separation unit 100 as a sweep fluid by conduit 209. Control valve 208 is controlled by a fluid analyzer unit 207 which is connected to analyze the effluent fluid composition in conduit 204. The sweep fluid and permeated fluid are removed from the first stage casing assembly through conduit 211 and supplied to compressor unit 212 which raises its pressure prior to being supplied via conduit 213 to the interior of the hollow filaments of second or final stage separation apparatus 100. The fluid from the interior of the hollow filaments of final stage apparatus 100 is passed along conduit 214 and 215 to control valve 218 and thence through conduit 216 is recycled into the inlet stream to the first stage separation unit. Control valve 218 is controlled by a fluid analyzer unit 217 which is connected to analyze the composition of the recycled effluent stream from the second stage separation unit. Permeated fluid is removed from the second stage casing assembly through conduit 219 as the final permeate product. Fluid analyzer unit 220 analyzes the compositions of the final product fluid and is operatively connected to analyzer unit 217 as will be discussed at a later point.

In operating this system of FIGURE 6, automatic control, or pressure regulating valves 202 and 206 maintain the feed fluid and effluent fluid pressures at desired values. Fluid analyzer unit 207 determines the concentration of the more permeable components of the process fluid in the depleted effluent fluid and operates control valve 208 to maintain a desired constant low concentration. Thus, if the effluent concentration becomes too high, control valve 208 is opened to increase the sweep fluid flow; if too low, the sweep fluid flow is decreased. Similarly, fluid analyzer 217 determines the concentration of the more permeable components in the recycle fluid and operates control valve 218 to maintain a constant concentration, which is set or determined by analyzer unit 220 of the product stream. If the concentration of the recycle fluid becomes too high, analyzer unit 217 causes control valve 218 to close to reduce the flow of the recycle fluid, thereby increasing the fraction of the inlet fluid to the second stage unit which permeates through the hollow filament membranes and reducing the concentration of the more permeable components in both recycle and product fluids. Similarly, if the concentration of the product fluid becomes too low in the more permeable components, analyzer 220 raises the set point of analyzer unit 217 which in turn causes control valve 218 to open to increase the recycle flow rate, reducing the fraction of inlet fluid to the second stage unit which permeates and increasing the concentration of the more permeable components in both recycle and product fluid streams.

In operating a two stage separation system of the FIGURE 6 type to concentrate helium in a mixture of helium and nitrogen, a gas mixture containing 0.47% helium were compressed to 400 p.s.i.g. and combined with a recycle stream described below. The resulting feed gas (5315 standard volumes per minute) was passed into a separation apparatus unit of the type shown in FIGURE 1 having hollow filament membranes composed of poly (ethylene terephthalate). The feed gas was passed into one end of the apparatus, through the interior of the hollow filaments, and out the other end of the apparatus. A portion of the starting gas was reduced in pressure to 9.8 inches of mercury and passed as a sweep gas into the tubular casing assembly of the unit near its exit end. The depleted effluent gas which had passed through the interior of the hollow filaments of the first stage contained 0.047% helium for a recovery of 90%. The combined permeate and sweep gas (693 volumes per minute) from this first stage unit contained 3.6% helium. This combined permeate and sweep gas was compressed to 450 p.s.i.g. and passed through the interior of the hollow filament membranes of the second stage unit (also of the type shown in FIGURE 1) 242 volumes per minute. After passing through the interior of the hollow filaments of the second stage unit, the depleted recycle stream contained 1.63% helium at a pressure of 438 p.s.i.g. The permeate product taken from the inlet end of the tubular casing assembly of the second stage unit (8 volumes per minute) contained 63.0% helium. The recycle gas was combined with the starting gas mixture to make the feed to the first stage unit.

Systems of this type can be used with suitable hollow filament membrane compositions to obtain air enriched with oxygen, to recover hydrogen of increased purity from its mixture with other gases, to separate methane from other hydrocarbons, and for other separations.

FIGURE 7 shows a somewhat more elaborate system than that of FIGURE 6 and embodying principles of the invention preferably used for repurifying helium or recovering oxygen from air. This three stage system comprises nine compressors C, in three sets, all preferably driven by suitable means such as electric motors, each set associated with one or more permeation apparatus units 100 at each of the three stages. The initial or feed stream moves through conduit 301 to a sampling device S thence to a flow rate measuring device R and on through conduit 302 to pressure gage G and the first stage compressor C. At the exit of this and all of the compressors C the flow passes serially by a pressure gage G, through two water cooled heat exchangers and an automatic filter trap comprising filter F and trap T before entering the second compressor C of that separation stage. Each filter trap T is connected to return oil to its own compressor to maintain lubricant level. Each compressor unit is supplied independently with water for the cylinder head and heat exchangers. The inter-compressor pressures are monitored by gages G and limited by relief valves (not shown). The pressure at the final compressor C of each separation stage is adjusted by a back pressure regulator returning to a ballast tank (not shown) which also serves as a feed gas reservoir. It will be seen from this FIGURE 7 showing that the inlet stream, depleted inlet or effluent stream, and permeate stream for each separation unit 100 are each monitored as to pressure by gages G and as to rate of flow by flow rate measuring devices R. In addition the "dead end" pressure in the casing assembly of each separation unit is monitored by gages G. Provision also was made (not shown) for recycling depleted gas or effluent from each of the second and third separation stages and for analyzing the composition of the stream moving in any flow line. It will be apparent from FIGURE 7 that the feed stream moves through the three compressor units C associated with the first separation stage and is passed via conduit 315 through the interior of the hollow filaments of the first separation stage unit 100, the depleted stream leaving the interior of the hollow filaments then passing through conduits 316 and 317 to be recycled or vented. The permeated stream is removed from the casing assembly of the first separation stage unit by conduit 318 and supplied to the three compressors associated with the second separation stage unit. The stream from these compressors is supplied as an inlet stream via conduit 332 to the interior of the hollow filaments of the second separation stage unit 100, the depleted stream leaving the interior of the hollow filaments of this unit through conduits 333 to be recycled or vented. The permeate stream is removed from the casing assembly of the second separation stage unit via conduit 334 and supplied to the three compressors associated with the third separation stage unit 100. The stream from these compressors is supplied as an inlet stream via conduit 349 to the interior of the hollow filaments of the third stage separation unit 100, the depleted stream leaving the interior of the hollow filaments of this unit through conduits 350, 351 to be recycled or vented as desired. The permeate or final product stream is removed from the casing assembly of the third stage separation unit via conduit 352 and through another back pressure regulator unit R.

In operating the FIGURE 7 system an analyzer unit analyzing the permeated product of the third stage separation unit adjusts the set point of a second analyzer unit analyzing the recycled stream from the second stage separation unit which in turn controls the rate of flow of this recycled stream. The rate of flow of the effluent streams (when recycled) is controlled by valves V. This mode of operation has advantages since the composition of the third stage permeate product stream does not change as quickly or as much in response to changes in the second stage recycle flow rate as does the composition of either the second stage recycle or permeate stream. In a somewhat less desirable variation of operation of this three stage system, the flow of recycle gas from the third stage is controlled in response to changes in its composition. This variation is less desirable because the volume of this third stage recycle gas is considerably smaller than the volume of the second stage recycle gas and because it changes much less in composition with changes in its flow rate because it contains an appreciably higher concentration of more permeable components. However, this three stage system is very effective in separating a product gas of very high purity from a feed gas of moderate purity, such as a very pure helium from a mixture containing about 40% to about 70% helium. In such an arrangement, a countercurrent sweep gas may be used in the first stage unit or units, using depleted effluent gas from the first stage rather than the initial feed mixture.

FIGURE 8 shows a separation system which may be viewed as a three stage system utilizing separation units similar to that shown in FIGURE 1 in which the effluent or depleted inlet stream from the first stage arrangement is stripped or treated in an auxiliary stage. The feed stream, entering through conduit 430 passes through a filter and then via conduit 431 into the interior of the hollow filaments of the first stage permeation unit 100. The depleted stream or effluent coming from the interior of the hollow filaments of the first stage permeation unit is conducted by conduit 432 into the interior of the hollow filaments of the auxiliary stage permeation unit 100. The depleted stream or effluent from the interior of the hollow filaments of the auxiliary stage permeation unit is vented or otherwise disposed of via conduit 433. A portion of this effluent stream is supplied by conduit 434 into the casing assembly of the auxiliary stage permeation unit as a sweep gas. This sweep gas and gas permeated outwardly through the hollow filaments of the auxiliary stage unit is carried via conduits 435, 438 to a "deoxo" unit where it is reacted with air to remove any hydrogen by forming water therewith, the water being removed in the dryer unit. A portion of the sweep gas and permeated gas from the casing assembly of the auxiliary stage unit is passed into the first stage unit casing assembly as a sweep gas by conduit 436. This sweep gas and permeated gas from the first stage unit casing assembly are carried by conduit 437 to join the stream carried by conduit 435, moving to the "deoxo" unit. After passing through the "deoxo" unit and dryer units this stream is supplied to the compressor C associated with the second stage permeation unit or units by conduit 441. The stream then is supplied as an inlet stream via conduits 443, 444, 446, and 447, to two points adjacent the casing assembly ends in the casing assembly of the second stage unit 100. This depleted inlet stream is removed from the casing assembly of the second stage unit at a point intermediate the ends of the assembly and recycled to the inlet stream of the first stage unit by means of conduit 442. The gas stream permeated inwardly through the hollow filaments of the second stage unit is collected and carried away from the interior of the hollow filaments, as shown, by conduits 448, 449 and led via conduit 450 to the compressor C associated with the third stage permeation unit. From this compressor the stream is supplied as an inlet stream via conduits 451, 452, 453 to two points adjacent the casing assembly ends in the casing assembly of the third stage unit. This depleted or effluent stream is removed from the casing assembly of the third stage unit at a point intermediate the ends of the assembly and recycled via conduit 445 to the inlet stream of the second stage unit. The gas stream permeated inwardly through the hollow filament membranes of the third stage permeation unit is collected and carried away from the interior of the hollow filaments, as shown, by conduits 454, 455, 456 as a final permeate product, compressed at a final compressor C and led to storage or use via conduit 457.

In operating this FIGURE 8 system, a fluid mixture containing a relatively high concentration of the more permeable components is fed to the first stage permeation unit, the depleted effluent from this first stage being supplied as an inlet stream to the auxiliary stage unit which also is provided with a sweep fluid. The permeated fluid and sweep fluid from the first and auxiliary stages are mixed with the recycled effluent stream from the third stage unit, and the permeated fluid from the second stage is further concentrated or enriched in the third stage. In controlling this system, the flows of sweep gas are regulated to obtain a desired low concentration in the depleted effluent from the auxiliary stage. The recycled effluent stream from the third stage is adjusted to obtain the desired high concentration of the permeated product. This system is particularly useful when the feed fluid contains a relatively high concentration of an especially valuable more permeable component, such as in the recovery of over 95% of the helium from a 60% helium mixture as a 99.9% or higher purity product.

The data given in the following tables (Table I and Table II) is representative of the physical features (Table I) and operating conditions and values (Table II) typical of a system such as that shown in FIGURE 8 operating to product 1 million cubic feet of helium per day at 14.7 p.s.i.g. and 70° F. from a feed gas as indicated. The feed gas composition is composed of helium, nitrogen, methane, and hydrogen in the percentages indicated in Table II. The hollow filament membrane composition is as-spun poly(ethylene terephthalate).

TABLE I

| Stage | First | Auxiliary | Second | Third |
|---|---|---|---|---|
| Hollow filament I.D. (microns) | 15 | 15 | 20 | 20 |
| Hollow filament O.D. (microns) | 28.2 | 28.2 | 37.8 | 37.8 |
| Hollow filament void fraction (percent) | 28 | 28 | 28 | 28 |
| Hollow filament active length (ft.) | 10 | 10 | 10 | 10 |
| Total number of filaments (mm.) | 1060 | 450 | 322 | 225 |
| Casing assembly I.D. (in.) | 12 | 12 | 12 | 12 |
| Permeation separation units | 19 | 8 | 10 | 7 |
| Operating temperature (° C.) | 40 | 40 | 40 | 40 |
| Feed or inlet to units | (1) | (1) | (2) | (2) |

[1] Interior hollow filaments.
[2] Casing assembly.

TABLE II

| Proc. Point No., Fig. 8 | Proc. Point Descr., Fig. 8 | Oper. Press.[1] | Flow [2] | Percent He | Percent $N_2$ | Percent $CH_4$ | Percent $H_2$ | Percent $O_2$ | Percent $H_2O$ |
|---|---|---|---|---|---|---|---|---|---|
| 401 | Init. Feed | 1,400 | 1,188 | 58.5 | 39.4 | 1.8 | 0.3 | 0 | $1.6 \times 10^{-6}$ |
| 402 | | 415 | 1,188 | 58.5 | 39.4 | 1.8 | 0.3 | 0 | $1.6 \times 10^{-6}$ |
| 403 | Stage 1 Feed | 415 | 1,329 | 58.5 | 39.4 | 1.8 | 0.3 | 0 | $1.6 \times 10^{-6}$ |
| 404 | Aux. Stage Feed | 315 | 552 | 3.6 | 92.3 | 4.1 | .015 | .055 | 0 |
| 405 | Effl. Gas Waste | 215 | 499.8 | 0.12 | 95.53 | 4.3 | $7 \times 10^{-4}$ | .046 | 0 |
| 406 | Aux. Stage P'meate | 15 | 52.2 | 36.9 | 59.3 | 3.5 | 0.15 | 0.148 | 0 |
| 407 | Stage 1 P'meate | 15 | 777 | 97.0 | 2.36 | 0.16 | 0.48 | .01 | 0 |
| 408 | Feed to Deoxo Unit | 15 | 829.2 | 93.0 | 6.16 | 0.36 | 0.46 | 0.185 | 0 |
| 409 | Feed to Dryer Unit | 15 | 838.8 | 92.6 | 7.0 | 0.36 | .00012 | 0.046 | 0.46 |
| 410 | Air to Deoxo | 15 | 9.6 | 0 | 79 | 0 | 0 | 21 | 0 |
| 411 | | 15 | 835.2 | 92.6 | 7.0 | 0.36 | .00012 | 0.046 | 0 |
| 412 | | 425 | 835.2 | 92.6 | 7.0 | 0.36 | .00012 | 0.046 | 0 |
| 413 | Stage 3 Recycle | 425 | 78.6 | 98.96 | 0.96 | 0.06 | .0002 | 0.022 | 0 |
| 414 | Stage 2 Feed | 425 | 912.6 | 93.0 | 6.5 | 0.23 | .00013 | 0.044 | 0 |
| 415 | Stage 2 Recycle | 415 | 140 | 58.4 | 39.22 | 2.1 | .00023 | 0.27 | 0 |
| 416 | Stage 2 P'meate | 15 | 772.8 | 99.89 | 0.1 | .006 | .00011 | .0024 | 0 |
| 417 | Stage 3 Feed | 435 | 772.8 | 99.89 | 0.1 | .006 | .00011 | .0024 | 0 |
| 418 | Stage 3 P'meate | 15 | 694.2 | 99.998 | .0015 | .0001 | .0001 | .00012 | 0 |
| 419 | Product | 4,000 | 694.2 | 99.998 | .0015 | .0001 | .0001 | .00012 | 0 |

[1] P.s.i.a. [2] Flow in S.C.F.M.

FIGURE 9 shows a preferred four stage separation system embodying principles of the invention and utilizing in each stage one or more separation units of the general type shown in FIGURE 1. The feed or inlet stream, entering the system through conduit 501 passes through a pressure regulating valve 502 and a control valve 504 actuated by an automatic controller 545 for final feed stream pressure control and then via conduit 505 into the interior of the hollow filaments of the first stage permeation unit 100. The depleted stream or effluent coming from the interior of the hollow filaments of the first stage permeation unit is conducted by conduit 506 to a control valve 507 actuated by an automatic controller 532 for effluent pressure control. From valve 507 this stream passes through conduit 508 to vent, recycling, or other disposition. A portion of the feed stream is diverted through a flow sensing device 534, conduit 533, pressure regulating valve 541, conduit 539, control valve 538, and conduit 540 into the casing assembly of the first stage permeation or separation unit 100 as a sweep stream. This sweep stream and the fluid permeated outwardly through the hollow filaments of the first stage permeation unit is carried from the casing assembly of the unit by conduit 509 to compressor unit C1 and thence via conduit 510 into the interior of the hollow filaments of the second stage permeation unit 100. The depleted stream or effluent coming from the interior of the hollow filaments of the second stage separation, or permeation, unit is carried via conduit 511, control valve 557, and conduit 591 as a recyle stream to join with the inlet stream supplied by conduit 505 to the interior of the hollow filaments of the first stage separation unit. The fluid permeated outwardly through the hollow filaments of the second stage separation unit is carried out of the casing assembly of this unit by conduit 513 to compressor unit C2. From compressor unit C2 this stream is supplied as an inlet stream via conduit 514 into the casing assembly of the third stage separation unit 100 at two spaced inlet points each adjacent one end of this casing assembly. The depleted stream or effluent from the casing assembly of the third stage separation unit is removed therefrom at a point on the casing assembly between the two inlet points by conduit 515 and passes through pressure regulating valve 516, and conduit 517 to be recycled into the inlet stream to the second stage separation unit carried by conduit 509. The stream of fluid which permeates inwardly through the hollow filaments of the third stage separation unit is removed from both ends of the interior of the hollow filaments and the unit by means of conduits 518, 519 and carried via conduit 520 to compressor C3. From compressor unit C3 this stream is supplied as an inlet stream via conduit 521 into the casing assembly of the fourth and final stage separation unit at two spaced inlet points each adjacent one end of the casing assembly. The depleted or effluent stream from the casing assembly of the fourth stage separation unit is removed therefrom at a point on the casing assembly intermediate the two inlet points and moves for recycling through conduit 522, pressure regulating valve 523, and conduit 524 to be recycled into the inlet stream to the third stage separation unit carried by conduit 513. The stream of fluid which permeats inwardly through the hollow filaments of the fourth stage separation unit is the final permeat product and is removed from both ends of the interior of the hollow filaments and the unit by means of conduits 525, 526 and carried to storage or use by conduit 527. The composition, or concentrations of the permeate product stream is preferably continuously monitored by analyzer unit 578.

Each compressor unit is provided with a by-pass vacuum breaker arrangement as shown to control the pressure of the permeate streams.

The flow rates of the effluent streams from the third and fourth stage separation units were controlled by control valves 566 and 575, in conduits 567 and 576 respectively, to maintain the desired concentration or compositions of these streams and of the final permeate product.

The system is provided with process control unit 551 which alternately analyzes the effluent stream concentration or composition leaving the first stage separation unit and the recycled stream concentration or composition leaving the second stage separation unit. A bleed line or conduit 560, having a pressure regulating valve 561 therein connects the effluent stream in conduit 506 to unit 551 for analysis and a bleed line 562 having pressure regulating valve 563 therein connects the recycle stream in conduit 511 to unit 551 for analysis. A signal representative of the analysis of effluent (concentration or composition) in conduit 506 is transmitted via conduit 550 to controller unit 547 which compares the signal with the desired or set-point concentration or composition and generates an error or difference signal which is transmitted to controller unit 536. A rate of flow signal generated by flow sensing device 534 is transmitted to controller unit 536. With these two inputs, controller unit 536 actuates control valve 538 to maintain a desired predetermined concentration or composition in the effluent stream from the first stage separation unit. A signal representative of the analysis of recycle concentration or composition in conduit 511 is transmitted via conduit 552 to controller unit 553 which compares the signal with the desired or set-point concentration or composition and generates an error or difference signal which is transmitted to controller 555. A pressure difference signal generated by pressure sensing device 559 connected across conduits 511 and 510 is transmitted to controller 555. With these two inputs, controller unit 555 actuates control valve 557 to control the flow in conduit 511 and maintain a desired predetermined concentration or composition in the recycled effluent stream from the second stage separation unit.

Summarizing generally the operation of the FIGURE 9 system, the flow of sweep fluid to the casing assembly of the first stage separation unit is adjusted by means of control valve 538 and controller units 547 and 536 to maintain a predetermined low concentration, or composition, of the more permeable components in the depleted effluent carried by conduit 506. In addition, the flow of either the second stage recycle stream, the third stage recycle stream, or the fourth stage recycle stream is adjusted in response to changes in the concentration, or composition, of the second stage permeate stream, the third stage permeate stream, or the fourth stage permeate product stream. The preferred arrangement as illustrated in FIGURE 9 is to control the rate of the second stage unit recycle stream to maintain a desired high concentration of the more permeable component in the fourth stage permeate product stream. Such a system with this process of operation is especially useful in recovering a high fraction of a high purity product from a fluid mixture containing a low concentration of a more permeable component, as for example in recovering helium from natural gas.

A pilot plant for recovering helium from natural gas using a four stage system embodying principles of this invention and of the type shown in FIGURE 9 was built and operated successfully. The system utilized hollow filament membranes of poly(ethylene terephthalate) with outside diameters of about 29.2 microns and inside diameters of about 15.5 microns. The first stage arrangement contained a number of separation units connected in parallel with a total of about 50 million hollow filaments with effective lengths of about 200 cm. and an effective total area of about 73,000 square feet. The second stage arrangement contained about 11 million hollow filaments with effective lengths of 75 cm. and an effective total area of about 617 square feet. The first and second stage arrangements operated with the feed or inlet streams supplied into the interior of the hollow filaments. The third and fourth stage arrangements operated with the feed or inlet streams supplied into the casing assemblies outside of the hollow filaments, each having active filament lengths of 86 cm., with about 10,400, and 3200 hollow filaments respectively and effective areas of about 66.4 and about 20.3 square feet respectively. This system included automatic control units for adjusting the flow of sweep gas to the first stage arrangement in response to analysis of the depleted effluent gas from the first stage arrangement, and for adjusting the flow of the second stage recycle stream in response to analysis of this recycle stream. In addition, the desired concentration of the recycle stream was changed or controlled in response to changes in the helium content of the fourth stage final permeate product. This pilot plant system operated continuously with minor fluctuations in flow rates and gas mixture compositions under the following conditions. (minor losses and those due to sample streams are not indicated) (Table III):

Likewise, an automatic control arrangement operating the system of this invention will adjust to a decrease in separation efficiency in any stage. Such a decrease can, for example, be caused by the development of a leak in a separation membrane which permits feed gas to mix with the product gas in one of the separation stages. If such a leak develops in an intermediate stage, the resulting decrease in purity of the feed gas to the next stage will tend eventually to decrease the purity of the product gas from the last stage. The automatic control system will then increase the recycle rate to increase product purity to the desired level and, as a necessary consequence, decrease the concentration of more permeable components in the recycle stream. Eventually this decrease in recycle stream purity will decrease the concentration of more permeable components in the recycle stream to the first stage and tend to decrease the con-

TABLE III

| Stream in Conduit No. | Stream Description | Pressure | Flow (s.c.f.m.) | Helium (Percent by volume) |
|---|---|---|---|---|
| 501 | System Feed | 740 p.s.i.g | 51.0 | 0.50 |
| 503 | do | 315 p.s.i.g | 50.9 | 0.50 |
| 540 | 1st Stage Sweep | −22.5 in. Hg | 0.12 | 0.50 |
| 593 | 1st Stage Feed | 315 p.s.i.g | 51.6 | 0.59 |
| 506 | 1st Stage Effluent | 248 p.s.i.g | 49.7 | 0.032 |
| 509 | 1st Stage Permeate | −22.5 in. Hg | 2.05 | 13.1 |
| 510 | 2nd Stage Feed | 375 p.s.i.g | 0.91 | 13.0 |
| 511 | 2nd Stage Recycle | 345 p.s.i.g | 0.76 | 3.8 |
| 513 | 2nd Stage Permeate | −15.5 in. Hg | 0.15 | 59.8 |
| 514 | 3rd Stage Feed | 200 p.s.i.g | 0.10 | 61 |
| 515 | 3rd Stage Recycle | 200 p.s.i.g | 0.06 | 10 |
| 518, 519 | 3rd Stage Permeate | 0 p.s.i.g | 0.04 | 85 |
| 521 | 4th Stage Feed | 110 p.s.i.g | 0.025 | 85 |
| 522 | 4th Stage Recycle | 110 p.s.i.g | 0.016 | 74 |
| 525, 526 | 4th Stage Permeate (Product) | 0 p.s.i.g | 0.010 | 99.9 |

The effectiveness of the control arrangement was tested by introducing upsets into the smoothly operating process. The following upsets were introduced:

(a) the set-point for the desired helium concentration was changed for the first stage depleted effluent and the second stage recycle streams, (b) the rate of flow of the inlet stream to the first stage was changed by changing the pressure of the first stage depleted effluent stream, and (c) the concentration of the feed or inlet stream to each stage was changed.

In all cases, the automatic control arrangement functioned to restore the process to equilibrium within a short time and the fourth stage permeate product concentration remained unchanged.

These control arrangements of these separation systems of the invention result in the smooth operation of continuous permeation separation processes and systems with a minimum of upsets. With appropriate instrumentation, the control system automatically adjusts itself to the many changes in process conditions which can occur during normal operation of a commercial plant. For instance, an increase in the concentration of the more permeable components in the feed gas will tend to increase their concentration in the depleted effluent gas and in the product gas from the first stage. In response, the control system will increase the amount of sweep gas to make operation of the first separation stage more efficient. The increased sweep gas will increase the volume and change slightly the concentration of more permeable components in the product gas from the first stage. The rate of flow of the second stage recycle stream then changes in response to changes in its concentration. These changes will eventually tend to increase the purity of the product gas from the last stage. In response, the control system will reduce the recycle rate from one of the stages. When the system reaches equilibrium, the net result will be maintenance of the desired low concentration of more permeable components in the depleted effluent gas and production of a product gas of the desired high purity at a faster rate.

centration of more permeable components in the depleted effluent gas. The automatic control arrangement disclosed will react to change the amount of sweep gas to restore the depleted effluent gas to its desired composition.

Another frequent advantage of the control technique and arrangement of this invention is a reduction in the number of stages required in a multistage process for separating the components of a gas mixture from the number required by similar processes of the prior art. This reduction in the number of stages results partly from operation of the initial stripping and later enriching stages at high efficiency and partly from operation of the process with recycle streams more concentrated in the more permeable components than the feed streams with which they are mixed. The recycle streams will normally make up only a small or moderate fraction of the total feed to any stage, but the concentration of the more permeable components in the recycle stream may in the early stages be from two to over ten times the concentration in the feed stream with which it is mixed, so the mixture has a significantly increased purity and therefore permeates more rapidly to give a product of increased purity. Similarly in the later stages, the recycle stream may have from half to one-tenth the concentration of the less permeable components and may make up from a small fraction to a major fraction of the total feed to a stage. The results is again a faster permeation of a significantly more pure product.

A corollary advantage of the control arrangements and technique of this invention is a reduction in the membrane areas needed in all stages in production of a desired amount of a product gas of desired purity. Operation with recycle streams more pure than the streams with which they are mixed implies efficient utilization of the membrane area present.

Another corollary advantage is reduced installation and operating costs because of the reduced number of stages and the reduced membrane area per stage. Operation with the control arrangement of this invention results in changes in the amount of first stage permeate almost in proportion to changes in the feed gas composition, and any required changes in membrane area can be made in the later stages, where the addition or removal of a single permeation unit has a relatively large effect on the capacity of the plant.

Operation of the enumerated gas operation processes and systems of this invention with tube-side feed, or feed to the interior of the hollow filaments in the first or stripping stages has the unexpected advantage of a very large difference in the efficiency of the separation obtained. This greater efficiency results from the improved contact between the feed gas and the membrane obtained with tube-side feed and the more favorable partial pressure differences obtained with improved contact, low permeate pressure, counter current flow, and the use of sweep gas. The practical effect is a very significant decrease in the membrane area required at any given production level.

Operation of the processes and systems of this invention with shell-side feed, or feed into the casing assembly outside of the hollow filaments, in the final or enriching stages without a sweep stream has the unexpected advantage and result that reduced permeation rates and decreased permeate purities resulting from imperfections and deficiencies of the hollow filaments are greatly reduced or completely eliminated. The technical basis for this unobvious result is described in the following discussion.

With tube-side feed, or feed into the filament interiors, a plugged hollow filament is filled with stationary gas derived from either the feed mixture or the effluent mixture. As this gas becomes depleted by permeation of the more permeable components, the concentration of less permeable components increases and significant amounts permeate to reduce the concentration of more permeable components. The result is decreased permeate purity and reduced permeate volume because of the plugged hollow filament. With shell-side feed, or feed into the casing assembly, and countercurrent operation, a hollow filament which is plugged near the feed end of the apparatus is, in effect, plugged at both ends since countercurrent operation involves removing permeated gas from the hollow filaments only at the feed end of the apparatus. A hollow filament which is plugged near the end of the apparatus from which the depleted effluent gas is removed is, conversely, not significantly different from other hollow filaments in the apparatus. The net effect of plugged hollow filaments with shell-side feed is, therefore, a small reduction in the amount of permeate without significant reduction in concentration.

With tube-side feed, restricted flow by partial plugging increases time of contact between the feed gas and the membrane and therefore increases the fraction permeated and reduces the purity of the permeate. The effect of the flow restriction on the quantity of the permeate will depend on its location. If the restriction is near the end of the apparatus from which depleted effluent is withdrawn, the average pressure inside the partially plugged hollow filament is increased with little change in permeate volume but permeate concentration is considerably decreased due to the longer contact time resulting from slower flow through the hollow filament.

With shell-side feed, partially plugged hollow filaments have little effect on permeate purity or volume because they have little effect on the pressure or flow rate of the low pressure, low density permeate.

Hollow filaments smaller than average have much the same effects as partially plugged hollow filaments, reducing permeate purity and volume with tube-side feed but not with shell-side feed.

With tube-side feed, hollow filaments larger than average permit faster flow of the feed gas, reduce contact time to reduce the fraction permeated, increase permeate purity, and increase the concentration of the more permeable components in the depleted effluent. With shell-side feed, hollow filaments larger than average provide more-than-average surface area, increase permeate volume, and slightly increase permeate concentration because of increased partial pressure differences due to lower permeate pressure.

With tube-side feed, a broken hollow filament is especially harmful, greatly increasing the volume of "permeate" and reducing its purity. Both the feed gas and the depleted effluent gas are at higher pressure than the permeate, so both flow through the open ends of a broken hollow filament to pass relatively large volumes of feed or effluent gas into the permeate space. Only a few broken hollow filaments per thousand therefore greatly reduce permeate purity and increase its volume. With shell-side feed, one end of each broken hollow filament is not used and the amount of feed gas passing through the other end is reduced by the pressure drop in the length of hollow filament between the break and the permeate exit. The advantage of shell-side feed is then to reduce the amount of feed gas passing into the permeate space by more than half.

Another unexpected advantage of shell-side feed in enriching stages is reduced danger of breaking hollow filament membranes with excessive pressure, less stringent requirements for control of operating pressure, and greater freedom in varying the operating pressure to balance the output of successive stages in a multistage process. With tube-side feed in enriching stages, the filament wall thickness which gives optimum high productivity and efficient separation at any particular pressure is frequently small enough to leave only a small margin of safety between the operating pressure and the threshold burst pressure at which a small fraction of the filaments will burst. Tube-side feed stages must, therefore, be operated within a narrow range of pressures for efficient use of their membrane areas without danger of bursting the filaments. With shell-side feed, on the other hand, considerably higher pressures can be used without danger of filament collapse. The amount of permeate obtained from a stage can then be conveniently varied by changing the operating pressure and adjusted to match and balance the amounts of gas handled in successive stages of the process. The resulting freedom in operating the process greatly reduces the size of the system and the complexity of the control arrangement required.

As an illustrative example of this, when the four stage system shown in FIGURE 9 is used in the described operation to produce 99.99+% helium from natural gas containing less than 1% helium with feed into the hollow filaments of the first two stages and into the casing assemblies outside the hollow filaments in the last two stages, calculations indicate that without this preferred arrangement, the system would require an additional stage, larger effective membrane surface area, and greater power for compression. With feed to the interior of the hollow filaments in all stages, an additional initial enriching stage would be required with a moderate increase in effective membrane area but requiring also a more significant increase in power for compression. With feed into the casing assembly outside of the hollow filaments in all stages, an additional final stage would be required with a large increase in effective membrane area but a less significant increase in power for compression.

Feed to the interior of the hollow filaments is preferred in initial separation stages when the feed gases contain less than about 25% of the more permeable components and is more preferred and advantageous when this percentage is less than about 5%. Feed into the casing assembly is preferred for final separation stages when the feed gases contain more than about 80% of the more permeable components and is more preferred and advantageous when this percentage is more than about 95%.

It has been indicated in the preceding descriptions of the multi-stage systems embodying features of this invention that a given separation stage, or separation stage arrangement, may comprise a number of separation units connected in parallel. An illustrative multi-unit stage arrangement of this type embodying principles of the present invention is shown in FIGURE 9a. This arrangement will be described as representative of an initial stage of the FIGURE 8 helium separation system. In this figure, the feed stream passes through conduit 620, pressure regulating valve 605, and conduit 621 from which it is divided and flows through conduits 636, 644, and 651 to control valves 637, 645, and 652 respectively, and thence via conduits 638, 646, and 653 respectively to the interior of the hollow filaments of separation units A, B, and C respectively. The depleted effluent streams from the interior of the filaments of separation units A, B, and C move via conduits 639, 647, and 654 respectively, control valves 602a, 602b, and 602c respectively, valves 641, 649, and 656 respectively, and conduits 642, 650, and 657 respectively, and thence join in conduit 643 to proceed through pressure regulating valve 606 to vent or recycle. A portion of the feed stream in conduit 621 is led off by conduit 622 through valve 607 to conduit 623 from which it is divided and flows through conduits 624, 628, and 632 respectively to valves 625, 629, and 633 respectively, thence via conduits 626, 630, and 634 respectively to valves 601a, 601b, and 601c respectively, from which conduits 627, 631, and 635 carry the streams into the casing assemblies of separation units A, B, and C respectively as sweep gas streams. The sweep gas streams and permeated streams are carried from the casing assemblies of permeator units A, B, and C by conduits 658, 661, and 663 respectively, through valves 659, 662, and 664 respectively, to join as one permeate product stream in conduit 660. Pressure drop sensing device 609 selectively senses the pressure drop across the feed stream-effluent of each separation unit by means of conduits 670, 669, 668, 672, 674, and valves 673, 674, and 667. Pressure drop sensing device 608 senses the pressure drop across the entire stage as shown and the feed and effluent pressures are controlled by pressure regulating valves 605 and 606 respectively. In order to illustrate the types of variations in characteristics possessed by separation units of the same type and size the permeator units might be described as follows:

*Unit A.*—Optimum condition, all hollow filaments identical in size and shape, leak-free and unrestricted; thus, for a given operating pressure and feed gas concentration, its separation performance will have a maximum value.

*Unit B.*—Marginal in quality, hollow filaments may be undersize, or of non-uniform sizes and/or shapes, may be plugged or restricted and may have leaks; thus when operated under same conditions as separation unit A, it will have reduced gas-handling capacity and both permeate and effluent concentrations will be low.

*Unit C.*—Short hollow filaments and/or oversize hollow filaments will have a large capacity with high permeate and effluent concentrations. Its recovery of permeate gas will be low.

In the operation of the separation arrangement, it is desirable to maintain permeate and effluent concentrations at some constant practical value. And, in order to facilitate the adjustment of effective membrane area by adding or removing separation units to or from a given stage arrangement, it is very desirable that each individual separation unit have the same gas handling capacity and separation performance. Starting with sweep stream valves 601a, 601b, and 601c fully closed and effluent stream valves 602a, 602b, and 602c fully open, these objectives can be achieved by adjusting these valves to give the concentration required. Opening an effluent stream control valve, such as 602a, will increase separation unit capacity and produce higher permeate and effluent stream concentrations; opening of a sweep stream control valve, such as 601a, will not affect capacity but will greatly reduce the effluent stream concentration with only a small change in the permeate stream concentration. When a given separation unit has been adjusted to give the same gas handling capacity and separation performance as the others, the pressure drop across it as indicated or sensed by device 609 will be a measure of the quality performance of an individual separation unit. When, in a given unit set of valves, the sweep stream control valve, such as 601a, has been fully closed and the effluent stream control valve, such as 602a has been fully opened, further adjustment cannot be made and that unit should be removed from service.

A preferred arrangement for manufacturing the improved fluid separation apparatus of the invention is illustrated in FIGURES 10-20 of the drawings.

Continuous hollow filaments either in the form of monofilament or multi-filament yarns are received in wound packages P which are positioned as shown on a supply frame structure 700 (FIGURE 10) which comprises vertical members 701 interconnected with horizontal members 702 preferably supported on wheels or rollers W. The filaments 111 or yarns from each package are led through suitable guide elements E carried by the supply frame structure to a suitable rotary apparatus 800 which winds up the hollow filaments to simultaneously form a plurality of skeins or hanks 110 as shown in FIGURE 10. The rotary apparatus shown comprises a base 703, a vertical support 704, in which is journalled a horizontal shaft 705. Shaft 705 is provided at one end with a pulley wheel 706 which is driven by an endless belt or chain 707. Shaft 705 carries at its other end a circular member 708 which carries a plurality of radially extending elements 709 each carrying a laterally extending hank supporting element 710. Each element 710 is provided with cut out portions 711 for receiving the hanks 110 formed by winding up the hollow filaments from the packages P.

After hanks 110 of suitable size are formed, rotation of apparatus 800 is terminated and the hanks removed therefrom. Each hank is then engaged at two diametrically opposed positions by suitable means such as hook elements 720 and by manipulating the hook elements as shown in FIGURE 11 the hank is flattened and elongated as shown to form a single compact bundle. While each bundle 110 is maintained in this configuration by sufficient tension applied to the hank elements 720, a porous flexible sleeve 112, preferably of a circularly knit construction as described in the preceding portions of the specification, is placed around the bundle and extending longitudinally along the bundle. As previously described the porous sleeve member 112 is of a construction such that tension applied to it longitudinally causes its transverse dimension, or periphery to diminish. The sleeve member 112 may be applied by placing it in accordion like pleated or folded configuration on a smooth annular bushing or guide N as shown in FIGURE 12. Then, with the bushing and sleeve member surrounding one end of the filament bundle 110, the bushing is moved toward the other end of the bundle and the sleeve member allowed to pull off the bushing and engage the filament bundle in a snug constraining fit uniformly along the bundle length as indicated in FIGURE 12. It will be seen that longitudinal tension applied to the ends of the sleeve member will cause the reduction in the sleeve member transverse periphery to compact and compress the hollow filaments into a closely packed bundle or hank. As discussed previously, the flexible porous sleeve member is formed of a sufficiently strong and abrasion-resistant material and construction not only to maintain the compacting compressing action but also to protect the filaments during assembly and operation of the apparatus.

A plurality of sleeve-encased filament bundles or groups prepared in accordance with the preceding description are assembled and suspended at one end in a parallel vertically extending relationship as shown in FIGURE 13 by means of an annular ring or a plate element 721 to which are hooked or secured the hook elements 720 which carry the sleeve-encased filament groups or bundles. The plate element 721 is supported by suitable means such as the vertical chain 723 which, as shown in FIGURE 14, is led through the interior of a tubular casing assembly 101. The thus suspended plurality of sleeve-encased filament bundle or group is then further encased, as shown in FIGURES 14 and 15, by one or more larger flexible porous sleeve members 113 in a similar manner to that shown in FIGURE 12 for encasing the individual groups. The one or more larger sleeve members are then tensioned longitudinally to compact the plurality of groups into one compact cross section composite bundle which is of a size which can be drawn into the interior of the casing assembly 101 by tension or chain 723. The lateral or transverse compacting action of the sleeve members is sufficient to enable positioning of a closely packed bundle in a casing assembly to substantially fill the interior of the casing assembly with tightly packed filaments without flattening or damaging any of the hollow filaments which are in the small sizes used very fragile and susceptible to damage in handling. It is believed that it would be impossible to compress the same number of hollow filaments in a single large bundle sufficiently to give a close packing arrangement in a casing assembly by merely compressing the bundle from its outer periphery, without flattening or damaging at least those filaments around the outer periphery of the bundle. Other desirable aspects of assembling filament groups in the porous sleeve members and alternate sleeve member constructions have been discussed earlier in this specification.

When the single large composite sleeve encased bundle of hollow filaments has been positioned in the tubular casing assembly 101, a mold unit 905b is bolted to the end of the casing assembly 101 as shown in FIGURE 16, previous to which, if desired, an annular resilient gasket member K of suitable material, such as rubber or neoprene, is positioned in the tapered end portion of the casing assembly as shown in FIGURE 16. The mold unit 905b, in operative position, is secured in fluid tight relationship to the flange 102 of the casing assembly 101 by suitable means such as mold flange 907 and bolts 906. The mold unit is provided with a mold cavity MC which, in operative position, surrounds the ends of the groups of filaments making up the end of the large bundle of filaments as shown in FIGURE 16. The mold unit 905b is also provided with an inlet means 908a communicating with the mold cavity MC for the supply of the liquid molding material.

During rotation of the casing assembly 101 with the attached mold unit 905b so that centrifugal force acts in the direction of arrow CF in FIGURE 16, a solidifiable liquid, such as an epoxy resin mixture or other material as described in preceding portions of the specification, is introduced into the mold cavity surrounding the end of the filament bundle and engaging the interior tapered portion of the casing assembly. The centrifugal force developed by the rotation is sufficient to keep the solidifiable liquid from wicking along the hollow filaments into the interior of the casing assembly and maintains the liquid in a configuration with an inner surface SF which is relatively smooth, continuous, even and substantially free of sharp deviations in the direction along which the filaments extend. The liquid surface SF is also maintained by the rotation and centrifugal force in a concave cylindrical shape as shown in FIGURES 1 and 16. While continuing this rotation, the liquid is caused to solidify to form the fluid tight cast wall member 950 surrounding the filaments and engaging the casing assembly. The cast wall member with the mold unit removed is shown in FIGURE 17. The next step required is the severing of the end of the cast wall member and the looped ends of the filaments of the bundle by severing or cutting the cast wall member along line CL shown in FIGURE 17. This opens the ends of the hollow filaments embedded in and extending through the remaining portion of the cast wall member. One satisfactory method of accomplishing the severing action involves initially sawing through the cast wall member 950 followed by a shaving operation with a razor-sharp instrument to open or clear the hollow filament ends. Assembly of this end of the apparatus is completed by securing an outer end closure member 103 to the casing assembly as shown in FIGURE 1. The same technique may be used to complete the other end of the apparatus unit.

In an alternate casing technique for forming the cast wall member, the same procedure is followed except that an immiscible liquid more dense than the solidifiable material forming the wall member, is also supplied to the mold cavity during rotation. Naturally under the centrifugal action, this more dense liquid is positioned between the solidifiable liquid and the outer wall of the mold cavity and is controlled so that upon solidification of the casting liquid and removal of the more dense material, a cast wall member is formed as shown in FIGURE 18 in which the looped end portions of the filament bundle are exposed. In order to complete the formation of this cast wall member, it is only necessary to cut off the end portions of the filament bundle along line CL' shown in FIGURE 18 and open the end portions of the hollow filaments embedded in and extending through the cast wall member. It is desirable to first add the solidifiable material to the mold cavity and then add the immiscible more dense liquid. This results in a coating of the end portions of the hollow filaments by the solidifiable material which coating persists through the application of the immiscible liquid and solidifies in a thin coating on the filament end portions which makes them much easier to cut.

A number of suitable materials can be used as the immiscible liquid provided it is more dense than the setting, or solidifiable material, unreactive with the hollow filaments, and solidifiable material, and can be removed. The material may be hardenable temporarily by gelatin, polymerization or otherwise if it can be conveniently removed by heating, depolymerization, or dissolutiton without affecting the solidified cast wall member. Water is a convenient immiscible liquid for use with some solidifiable materials and if desired may be thickened or gelled with agar, gelatin, polyvinyl alcohol or the synthetic or natural gums. Low melting point paraffin waxes and hydrocarbon oils thickened into greases may also be used. However, the preferred immiscible liquid for use with epoxy resin setting materials are halogenated fluids such as the "Kel-F" fluorocarbon oils sold by the Minnesota Mining and Manufacturing Company. These oils are sufficiently more dense than epoxy resins and form a sharp interface therewith under moderate centrifugal forces.

Under certain circumstances, the manufacture of the improved gas separation units of this invention may require as an additional procedure, a technique for sealing leaks due to broken hollow filaments or leaks in the cast wall members. A preferred technique or procedure for sealing leaks involves the following steps:

(1) Placing the apparatus unit in a position such that a liquid will remain on the outer surface of one of the completed cast wall members 950, covering the open ends of the hollow filaments embedded in and passing through the wall member, (2) Applying elevated gas pressure to the upper and lower open ends of the hollow filaments and a lower pressure in the casing assembly 101 outside of the hollow filaments with a pressure differential between the lower and upper ends of the hollow filaments so that gas flows upwardly through the hollow filaments which are free of leaks but downwardly through any hollow filaments which have leaks and downwardly through any leaks through the cast wall member or between the filament and the surrounding cast wall member, (3) Concurrently with Step 2, covering the upper open ends of the hollow filaments with a solidifiable liquid such that the gas pressure at the upper ends of the unit forces the liquid downwardly into and remain within any leaking filaments and leaks in the cast wall member and the gas pressure at the lower end of the unit acting through the non-leaking hollow filaments prevents the liquid from entering the upper ends thereof, (4) Removing any excess liquid over the open ends of the hollow filaments, (5) Causing the liquid in the upper ends of the leaking fialments and in the leaks in the cast wall member to solidify and seal the leaks, and (6) Repeating the above steps to seal leaks at the other end of the unit and hollow filament bundle. It is important to determine an end-to-end pressure differential which adequately prevents the solidifiable liquid from entering the non-leaking filaments while not creating so much bubble formation as to interfere with the entrance of the solidifiable liquid into the upper end of the leaking filaments. Also important is the determination of the magnitude of the pressure differential between the upper ends of the filaments and the interior of the casing outside the filaments which will overcome the applied filament end-to-end pressure difference and seal up the hollow filaments with the smallest leaks.

In summary, this is a highly desirable and simple procedure by which solidifiable sealing material is drawn into leaks in the cast wall member and any leaking filaments and is simultaneously prevented from penetrating non-leaking filaments by a carefully controlled flow of gas. The procedure results in essentially complete sealing of leaks with little plugging of non-leaking filaments and therefore increases the separating efficiency of the apparatus without significantly reducing its capacity. In addition, the procedure is carried out with completely assembled permeation separation units in which easily broken hollow filaments are protected by the casing assembly and no further handling of the filaments is required in placing them in service. Also, this procedure can make practical the production of permeation separation apparatus of increased useful life by deliberately exposing the apparatus to pressures higher than the planned operating pressure, sealing of any leaks developed, and operating the appartus at the lower planned pressure.

FIGURES 19 and 20 show a preferred and an alternate appartus for forming the cast wall members of the separation units of the invention.

FIGURE 19 shows a permeation separation unit like that of FIGURE 1 suitably mounted on a preferred centrifugal apparatus ready for casting of the cast wall members 950. Removable mold units 905a and 905b are fastened in a fluid tight manner to flanges 102 and casing assembly 101 by means of bolts 906 and flange 907. Inlet fittings 908a and 908b through which the solidifiable wall material flows into the molds 905a and 905b are shown near the extreme ends of the mold units but may be at other locations as desired.

The centrifugal apparatus shown includes a stationary tubular housing or other suitable support 909, a rotating shaft (not shown), a drive pulley 911, a belt 912, a motor 913, a pedestal 914, a base 915, a clamping assembly 916, and other parts as required for support and rotation.

Suitable means for feeding a setting or solidifiable liquid to the molds 905a and 905b are also mounted on or part of the centrifugal apparatus. This means may be the hydraulic slip ring assembly 917 of FIGURE 19. This slip ring assembly includes a block of suitable material mounted on the centrifugal apparatus which contains in its upper surface groves 918a etc. in to which the setting or solidifiable liquid can be introduced and from which the setting liquid can flow to molds 905a and 905b through tubes 919a etc.

The hydraulic slip ring 917 may contain two, four, or more grooves 918a etc. to allow for feeding casting liquids at one or more levels into molds 905a and 905b. These grooves 918a etc. are conveniently slightly eccentric toward their outlets to induce the casting liquid to flow under centrifugal force toward their outlets and through tubes 919a etc. toward the molds. The grooves 918a etc. are also conveniently shaped to prevent flow of the casting material over their outside edegs during rotation.

Casting liquids may be introduced into the hydraulic slip ring assembly 917 in any convenient way. For example, they may be retained in containers 920a etc. and metered through valves 921a etc. through tubes 922a etc. leading to grooves 918a etc. This hydraulic slip ring and its associated parts provide for convenient and effective introduction of casting materials into molds 905a and 905b while the centrifugal appartus is in operation.

Before casting a wall member with the centrifugal apparatus of FIGURE 19, the following preliminary operations are completed: Hollow filaments are assembled and installed within casing assembly 101. Mold units 905a and 905b are then fastened to the ends of the casing assembly as shown. Final adjustment and trimming of the center of gravity of the complete assembly may be by attaching ordinary threaded nuts to the ends of tie bolts 906. After the unit is statically balanced, it is mounted on the centrifugal apparatus and clamped in place by suitable means. Hydraulic slip ring 917 is then assembled in place and feed lines 919a, etc., are connected to the various fittings on mold units 905a, etc., into the appropriate outlets of hydraulic slip rings 917.

The centrifugal casting operation then includes the following steps: Motor 913 is energized and the centrifuge is brought up to a speed which subjects mold units 905a, etc., to the desired centrifugal force. A setting or solidifiable liquid (and immiscible liquid, if used) is then introduced into the mold cups through the hydraulic slip ring and its various parts. The setting material is introduced at a convenient rate which allows sufficient time for the material to penetrate and fully impregnate the interstices of the hollow filaments in the mold cavity uniformly. After the liquid has reached the desired level, further addition is stopped. During the addition of the setting liquid the centrifuge is operated, as previously mentioned, at a speed which subjects the material within the mold units to the desired centrifugal force. Rotation is continued for a sufficient time to permit solidification of the setting liquid until it will maintain its shape.

When the setting material has sufficiently hardened, rotation is stopped and the separation unit is removed from the centrifugal apparatus. The unit may be set aside to allow further hardening of the setting material if desired. The final fabrication steps involve draining of the immiscible liquid, if used, removal of the mold units, cutting or otherwise breaking the hollow filament end portions (and the setting material if no immiscible liquid was used) to open the ends of the hollow filaments to fluid flow, and adding the outer end closure members 103 to form the head spaces 130, 130' of the separation unit. The unit is then ready for operation when provided with other necessary fittings and suitably connected to a source of the mixture to be separated and to means for removing the separated products.

FIGURE 20 shows another alternate type of centrifugal apparatus for casting cast wall members 950 in separation unit casing assemblies. This centrifugal apparatus includes a stationary support housing 923, spindle 924, motor 925, and other mechanical parts as necessary for support and rotation. A hydraulic slip ring assembly 917 may be mounted on spindle 924 with flexible tubes 919a etc. connecting slip ring 917 with molds 905a etc. At the upper end of spindle 924 is mounted platform 929 to which are rigidly attached trunnions 926a etc. These trunnions are equally spaced around the platform and diametrically opposed. Two, four, or more tubular casings 101 are pivotally attached to trunnions 926a etc. by means of clevices 927a etc., one end of each clevis being attached to a flange 102 of a casing assembly 101, while the other is journalled to a trunnion 927 with a pin 928. As shown by the dotted lines in FIGURE 20, tubular casings 101 hang vertically when the centrifuge is not operating. The method of operation of this apparatus is generally the same as that followed in the operation of the FIGURE 19 centrifugal apparatus.

The position of the openings 908a (FIGURE 16) through which the setting liquid is passed into the mold units can be varied as convenient. These openings may be located in the bottoms of the molds, so the setting material or immiscible liquid will progressively displace air from the extremities of the hollow filament bundles toward the center of the bundles, or the openings may be on the sides of the molds. The bottom location will usually be preferred when using an immiscible liquid and when using a setting material which tends to "wick" unevenly in the assembled hollow filaments, but the side location will be preferred when it is desired to add the setting material on top of an immiscible liquid, when the setting material tends to shrink on setting, and when it is desired to feed additional liquid setting material on top of partially set material to insure complete filling of cracks and voids resulting from shrinkage. Also, several openings can be provided at different locations on any particular mold cup, each with an associated feed system, so that the immiscible liquid and part of the setting material can be fed at one location and other parts of the setting material can be fed at one or more different locations.

When using an immiscible liquid, the liquid may be introduced into the mold either before or after the setting material. Addition of the liquid before the setting material may be preferred when it can be conveniently added through openings at the bottom of the mold and the setting material can be added through openings at the top of the mold. Addition of the setting material before the more dense immiscible liquid is preferred when both are to be added through openings at the bottom of the molds. Addition of the setting material first is desirable when the immiscible liquid wets the hollow filaments and is not easily displaced from their surfaces by the setting material. Addition of the setting material first is especially desirable when the setting material wets the hollow filaments and is not completely displaced by the immiscible liquid. Under these conditions, a thin film of the setting material hardens on the hollow filaments and stiffens them to simplify and make more efficient the later step of cutting them to open their bores for flow. Addition of the setting material first is also desirable when the immiscible liquid wets the hollow filaments because it makes practical the production of strong seals in which the hollow filaments are distributed uniformly throughout the potting area. Addition of the immiscible liquid first requires that the hollow filaments be relatively separate and far apart so the setting material will flow between the hollow filaments to form a uniform seal rather than remain near the inlet and force the immiscible liquid into areas which the setting material is intended to occupy.

The magnitude of the centrifugal force required to obtain the advantages of this invention depends of many factors. Important is the size and packing density of the hollow filaments, the viscosity and other flow properties of the setting material, the surface tension forces between the setting material and the hollow filaments and between the setting material and the walls of the mold unit, the reltaive densities of the hollow filaments and the setting material, and (in the alternate form of centrifugal apparatus in which the supports and the molds swing in response to centrifugal force) the weight and shape of the supports and molds.

In practice, centrifugal forces between a few times the force of gravity and several hundred times the force of gravity may be effective. The preferred range of centrifugal forces is between about 50 times gravity and about 200 times gravity. The minimum effective force may be between 5 and 25 times the force of gravity. Forces above about 900 times gravity however may be so great as to collapse the walls of thin-walled hollow filaments of polymeric materials and should be avoided. The centrifugal force used is easily controlled by varying the speed of rotation of the centrifuge as indicated by well-known mathematical expressions.

It is believed to be apparent that novel and improved gas separation units and systems, together with novel and improved methods of operation and fabrication have been provided in accordance with the objects of the invention.

Although a number of preferred embodiments have been described in detail in accordance with the patent statutes, many modifications and variations within the spirit of the invention will occur to those skilled in the art, and all such are considered to fall within the scope of the following claims.

What is claimed is:

1. An improved fluid separation apparatus for separating a permeable fluid from a fluid mixture according to the different permeation rates of each of the mixture components through a plurality of permeable membrane structures of polymeric composition and comprising hollow filaments, said apparatus comprising in combination, an elongated fluid-tight casing assembly, said casing assembly comprising a first end, said end closed by a fluid-tight cast wall member of polymeric composition, a plurality of filaments having hollow interior portions, said filaments extending from said cast wall member, said hollow filaments having diameters in the range of 10–500 microns and substantially uniform wall thicknesses in the range of 1–100 microns with open end portions embedded in and extending through said cast wall member in fluid-tight relation thereto, said casing assembly provided at said end with an outer closure member cooperating with said casing assembly and the cast wall member at said end to define a closed chamber in communication with the interior portions of said hollow filaments, said chamber provided with conduit means to permit movement of fluid between said chamber and a point outside said chamber, said casing assembly further provided with inlet and outlet means to permit movement of fluid into and out of said casing assembly, said plurality of filaments comprising a large bundle, said bundle comprising a significant portion having substantially parallel filaments surrounded by at least one elongated flexible porous sleeve member extending longitudinally of said filament bundle, said bundle and said at least one surrounding sleeve member substantially completely filling the interior cross section of said casing assembly, said porous sleeve member cooperating with the filaments of said bundle to constrain said filaments into a compact bundle which has a substantially uniform packing density of the filaments and which bundle has a yieldable perimeter in transverse cross section to permit substantially uniform, relatively close packing of a large number of filaments in said bundle and in said casing assembly without subjecting individual filaments to forces or pressures sufficient to damage or flatten said filaments during assembly and operation of said apparatus.

2. The improved apparatus of claim 1 in which said sleeve-encased filaments in said casing assembly engage each other in a number of elongated areas extending along the length of said filaments and said casing assembly to define between said filaments and between said filaments and the interior surface of said casing assembly a transversely substantially evenly distributed pattern of elongated restricted passageways extending along a length of said filaments and said casing assembly from said cast wall member to permit distributed flow of fluid longitudinally in said casing assembly outside of said hollow filaments and without substantial lateral mixing of fluid from one restricted passageway to the other.

3. The improved apparatus of claim 2 in which said casing assembly is provided adjacent said end with a transversely enlarged interior portion of increased cross sectional area in which portion the packing of said filaments is reduced to reduce the lateral stresses thereon and increase the space between said filaments adjacent said end of the casing assembly.

4. In the improved apparatus of claim 3 said inlet and outlet means comprising a passageway in said casing assembly communicating with said transversely enlarged interior portion of said casing assembly to permit supply and distribution of fluid to said elongated restricted passageways between said filaments and between said filaments and the interior of said casing assembly where the packing of the filaments is reduced and the space between the filaments is increased.

5. The improved apparatus of claim 1 in which said cast wall member is in fluid-tight engagement with said casing assembly and the exterior of said filaments, and is of a substantially uniform consistency, free of voids and bubbles, and having at least one peripheral surface in engagement with said casing assembly and two opposed major surfaces, one inner surface together with the exterior surfaces of the filaments and the interior surface of the casing assembly defining a "shell-side" zone, and the other exterior surface together with the interior surfaces of the filaments and the interior surface of the outer closure member defining a "tube-side" zone, said inner surface being relatively smooth, continuous, even and substantially free of sharp deviations in the direction along which said hollow filaments extend.

6. The improved apparatus of claim 5 in which said inner surface has the concave curved configuration of a portion of the interior of a right circular cylinder.

7. An improved fluid separation apparatus for separating a permeable fluid from a fluid mixture according to the different permeation rates of each of the mixture components through a plurality of permeable membrane elements in the form of hollow filaments, said apparatus comprising in combination, an elongated fluid-tight tubular casing assembly having a first end and a second end, each end closed by a fluid-tight cast wall member of polymeric composition, a plurality of filaments of polymeric composition and having hollow interior portions, said filaments extending between said cast wall members, said hollow filaments having diameters in the range of 10–500 microns and substantially uniform wall thicknesses in the range of 1–100 microns with open end portions embedded in and extending through said cast wall members in fluid-tight relation thereto, said tubular casing assembly provided at each end with an outer closure member cooperating with said tubular casing assembly and the cast wall member at that end to define a closed chamber in communication with the interior portions of said hollow filaments, each chamber provided with conduit means to permit movement of fluid between each chamber and a point outside each chamber, said casing assembly further provided with inlet and outlet means to permit movement of fluid into and out of said casing assembly, said plurality of filaments comprising a large bundle of substantially parallel filaments surrounded by at least one elongated flexible porous sleeve member extending longitudinally of said filament bundle, said bundle and at least one surrounding sleeve member substantially completely filling the interior cross section of said tubular casing assembly, said bundle comprising a number of smaller groups of substantially parallel hollow filaments, said groups of substantially the same size, each group surrounded by at least one elongated flexible porous sleeve member extending longitudinally of its filament group, said porous sleeve members cooperating with the filaments of each group to constrain said filaments into compact groups which have a substantially uniform relatively high packing density of the filaments and which groups have yieldable perimeters in transverse cross section to permit substantially uniform, relatively close packing of a large number of said groups in said larger bundle and said tubular casing assembly without subjecting individual filaments to forces or pressures sufficient to damage or flatten said filaments during assembly and operation of said apparatus.

8. The improved apparatus of claim 7 in which said sleeve-encased groups of filaments in said casing assembly engage each other in a number of elongated areas extending along the length of said groups and said casing assembly to define between said groups and between said groups and the interior surface of said casing assembly a transversely substantially evenly distributed pattern of elongated restricted passageways extending along a length of said groups and said casing assembly between said cast wall members to permit distributed flow of fluid longitudinally in said casing assembly from one end toward the other outside of said hollow filaments and without substantial lateral mixing of fluid from one restricted passageway to the other.

9. The improved apparatus of claim 8 in which said casing assembly is provided adjacent each end with a transversely enlarged interior portion of increased cross sectional area in which portion the packing of said groups of filaments is reduced to reduce the lateral stresses thereon and increase the space between said groups adjacent said ends of the casing assembly.

10. The improved apparatus of claim 9 in which said inlet and outlet means comprises a passageway in said casing assembly communicating with one of said transversely enlarged interior portions of said casing assembly to permit supply and distribution of fluid to said elongated restricted passageways between said groups of filaments and between said groups and the interior of said casing assembly where the packing of the groups is reduced and the space between the groups is increased.

11. The improved apparatus of claim 7 in which each said cast wall member is in fluid-tight engagement with said casing assembly and the exterior of said filaments, and is of a substantially uniform consistency, free of voids and bubbles, and having at least one peripheral surface in engagement with said casing assembly and two opposed major surfaces, one inner surface together with the exterior surfaces of the filaments and the interior surface of the casing assembly defining a "shell-side" zone, and the other exterior surface together with the interior surfaces of the filaments and the interior surface of the outer closure member defining a "tube-side" zone, said inner surface being relatively smooth, continuous, even and substantially free of sharp deviations in the direction along which said hollow filaments extend.

12. The improved apparatus of claim 11 in which said inner surface has the concave curved configuration of a portion of the interior of a right circular cylinder.

13. An improved fluid separation apparatus for separating a permeable fluid from a fluid mixture according to the different permeation rates of each of the mixture components through a plurality of permeable membrane structures of polymeric composition and comprising hollow filaments, said apparatus comprising in combination, an elongated fluid-tight tubular casing assembly, said casing assembly comprising a first end, said end closed by a cast wall member of polymeric composition, a plurality of filaments having hollow interior portions, said filaments extending from said cast wall member, said filaments having external diameters in the range of about 10 to about 500 microns and substantially uniform wall thicknesses in the range of about 1 to about 100 microns with open end portions embedded in and extending through said cast wall member, said tubular casing assembly provided at said end with an outer closure member cooperating with said tubular casing assembly and the cast wall member at that end to define a closed chamber in communication with the interior portions of said hollow filaments, said chamber provided with conduit means to permit movement of fluid between said chamber and a point outside said chamber, said casing assembly further provided with inlet and outlet means to permit movement of fluid into and out of said casing assembly, said plurality of filaments comprising a bundle of substantially parallel filaments surrounded by at least one elongated flexible porous sleeve member extending longitudinally of said bundle to constrain said filaments into a compact minimum periphery configuration, said bundle and sleeve member substantially filling the interior cross section of said casing assembly, said cast wall member being in fluid-tight engagement with said casing assembly and the exterior of said filaments, said cast wall member being of a substantially uniform consistency, free of voids and bubbles, and having at least one peripheral surface in engagement with said casing assembly and two opposed major surfaces, one inner surface together with the exterior surfaces of the filaments and the interior surface of the casing assembly defining a "shell-side" zone, and the other exterior surface together with the interior surfaces of the hollow filaments and the interior surface of the outer closure member defining a "tube-side" zone, said inner surface being relatively smooth, continuous, even, and substantially free of sharp deviations in the directions along which the hollow filaments extend.

14. The improved apparatus of claim 13 in which a gasket element of resilient material is positioned in operative fluid-tight relationship between said casing assembly and said cast wall member.

15. The improved apparatus of claim 13 in which said inner surface has the concave curved configuration of a portion of the interior of a right circular cylinder.

16. An improved fluid separation apparatus for separation of a permeable fluid from a fluid mixture according to the different permeation rates of each of the mixture components through a plurality of permeable membrane elements in the form of hollow filaments, said apparatus comprising in combination, an elongated fluid-tight tubular casing assembly having a first end and a second end, each end closed by a fluid-tight centrifugally cast wall member of polymeric composition, a plurality of filaments of polymeric composition and having hollow interior portions, said filaments extending between said cast wall members, said hollow filaments having diameters in the range of 10–500 microns and substantially uniform wall thicknesses in the range of 1–100 microns with open end portions embedded in and extending through said cast wall members in fluid-tight relation thereto, said tubular casing assembly provided at each end with an outer closure member cooperating with said tubular casing assembly and the cast wall member at that end to define a closed chamber in communication with the interior portions of said hollow filaments, each chamber provided with outlet means to permit removal of permeated fluid from each chamber, said casing assembly further provided with an inlet means adjacent each end of said casing assembly to permit movement of inlet fluid into said casing assembly, said casing assembly further provided with an outlet means positioned at a point intermediate each inlet means to permit movement of depleted inlet fluid out of said casing assembly, said plurality of filaments comprising a large bundle of substantially parallel filaments surrounded by at least one elongated flexible porous sleeve member extending longitudinally of said filament bundle, said bundle and at least one surrounding sleeve member substantially completely filling the interior cross section of said tubular casing assembly, said porous sleeve member cooperating with the filaments to constrain said filaments into a compact group which has a substantially uniform packing density of the filaments approaching square close packing and which group has a yieldable perimeter in transverse cross section to permit substantially uniform, relatively close packing of a large number of said filaments in said tubular casing assembly without subjecting individual filaments to forces or pressure sufficient to damage or flatten said filaments during assembly and operation of said apparatus.

17. An improved fluid separation system comprising a plurality of operatively associated fluid separation stages for continuously progressively separating a permeable fluid from a fluid mixture according to the different permeation rates of each of the mixture components through a plurality of permeable membrane structures of polymeric composition and comprising hollow filaments, said plurality of stages comprising a first stage arrangement and a final stage arrangement, each stage arrangement comprising at least one fluid separation unit, each separation unit comprising an elongated fluid-tight tubular casing assembly having a first end and a second end, each end being closed by a fluid-tight cast wall member of polymeric composition, a plurality of filaments having hollow interior portions, said filaments extending between said cast wall members, the hollow filaments having diameters in the range of 10–500 microns and substantially uniform wall thicknesses in the range of 1–100 microns with open end portions embedded in and extending through said cast wall members in fluid-tight relation thereto, said tubular casing assembly provided at each end with a closure member cooperating with said tubular casing assembly and the cast wall member at that end to define a closed chamber in communication with the interior portions of said hollow filaments, said plurality of filaments comprising a bundle of substantially parallel filaments surrounded by at least one elongated flexible porous sleeve member extending longitudinally of said filament bundle, said bundle and sleeve member substantially completely filling the interior cross section of said tubular casing assembly, said separation unit having a "shell-side" zone limited by one side of said cast wall member, the exterior surfaces of said hollow filaments and the interior surface of said tubular casing assembly, said unit also having a "tube-side" zone limited by the other side of said cast wall member, the internal surfaces of said hollow filaments and the internal surfaces of said closure members, first conduit means for supplying an inlet stream of an initial fluid mixture to the "tube-side" zone of each of said first stage units, second conduit means for removing said initial fluid mixture from said "tube-side" zone of each of said first stage units when sufficiently depleted, third conduit means for supplying a sweep fluid stream to the "shell-side" zone of each of said first stage units, fourth conduit means for removing said sweep fluid and a permeated fluid fraction from said "shell-side" zone of each of said first stage units, fifth means operatively interconnecting said first stage arrangement with said final stage arrangement such that at least a portion of the permeated fluid fraction from a preceding stage arrangement is supplied as an inlet stream to said final stage arrangement to complete the desired separation, said fifth means comprising a sixth conduit means for directing the inlet stream supplied to said final stage arrangement into the "shell-side" zone of each of said final stage units, seventh conduit means for removing the final permeated fluid stream from the "tube-side" zone of each of said final stage units, and eighth conduit means for removing said inlet stream from said "shell-side" zone of each of said final stage units when sufficiently depleted.

18. The improved system of claim 17 in which said eighth conduit means, in addition, recycles said depleted stream from at least one unit other than the first stage units to the inlet stream supplied to at least one preceding stage arrangement.

19. The improved system of claim 18 which further comprises an automatic control means operatively associated with said first stage arrangement and responsive to the composition of the depleted fluid mixture removed from said "tube-side" zone of at least one of said first stage units to vary the rate of flow of the sweep fluid stream to the "shell-side" zone of at least one of said first stage units in order to maintain a predetermined degree of separation in said first stage arrangement.

20. The improved system of claim 18 which further comprises an automatic control means operatively associated with said final stage arrangement and responsive to the composition of the final arrangement and responsive to the composition of the final permeated fluid stream from the "tube-side" zone of at least one of the final stage units to vary the rate of flow of the recycled depleted stream in order to maintain a predetermined composition of said final permeated fluid stream.

21. The improved system of claim 19 which further comprises an automatic control means operatively associated with said final stage arrangement and responsive to the composition of the final permeated fluid stream from the "tube-side" zone of at least one of the final stage units to vary the rate of flow of the recycled depleted stream in order to maintain a predetermined composition of said final permeated fluid stream.

22. An improved fluid separation system comprising a plurality of operatively associated fluid separation stages for continuously, progressively separating a permeable fluid from a fluid mixture according to the different permeation rates of each of the mixture components through a plurality of permeable membrane elements in the form of hollow filaments, said plurality of stages comprising a first stage arrangement and a final stage arrangement, each stage arrangement comprising at least one fluid separation unit, each separation unit comprising an elongated fluid-tight tubular casing assembly having a first end and a second end, each end being closed by a fluid-tight centrifugally cast wall member of polymeric composition, a plurality of filaments of polymeric composition and having hollow interior portions, said filaments extending between said cast wall members, the hollow filaments having diameters in the range of 10–500 microns and substantially uniform wall thicknesses in the range of 1–100 microns with open end portions embedded in and extending through said cast wall members in fluid-tight relation thereto, said tubular casing assembly provided at each end with a closure member cooperating with said tubular casing assembly and the cast wall member at that end to define a closed chamber in communication with the interior portions of said hollow filaments, said plurality of filaments comprising a bundle of substantially parallel filaments extending longitudinally of said filament bundle, said bundle substantially completely filling the interior cross section of said tubular casing assembly, said separation unit having a "shell-side" zone defined by one side of said cast wall members the exterior surfaces of said hollow filaments and the interior surface of said tubular casing assembly, said unit also having a "tube-side" zone defined by the other side of said cast wall members, the internal surfaces of said hollow filaments and the internal surfaces of said closure members, first conduit means for supplying an inlet stream of an initial fluid mixture to the "tube-side" zone of each of said first stage units, second conduit means for removing said initial fluid mixture from said "tube-side" zone of each of said first stage units when sufficiently depleted, third conduit means for removing a permeated fluid fraction from said "shell-side" zone of each of said first stage units, fourth means operatively interconnecting said first stage arrangement with said final stage arrangement such that at least a portion of the permeated fluid fraction from a preceding stage arrangement is supplied as an inlet stream to said final stage arrangement to complete the desired separation, said fourth means comprising a fifth conduit means for directing the inlet stream supplied to said final stage arrangement into the "shell-side" zone of each of said final stage units, sixth conduit means for removing the final permeated fluid stream from the "tube-side" zone of each of said final stage units, seventh conduit means for removing said inlet stream from said "shell-side" zone of each of said final stage units when sufficiently depleted, and said seventh conduit means, in addition, recycles said depleted stream from each of said final stage units to the inlet stream supplied to at least one preceding stage arrangement 23. The improved system of claim 22 which comprises an eighth conduit means for supplying a sweep fluid stream to the "shell-side" zone of each of said first stage units.

24. The improved system of claim 22 in which said fifth conduit means directs the inlet stream into the "shell-side" zone of each of said final stage units at two spaced points each adjacent a different end of the tubular casing assembly of that unit, and in which said seventh conduit means removes said depleted stream from the "shell-side" zone of each of said final stage units at a point intermediate the said two spaced points.

25. The improved system of claim 22 in which at least one of said stages comprises an arrangement having a plurality of said fluid separation units of differing fluid separation characteristics operatively connected for parallel operation, each of said units connected, constructed, and arranged to receive an inlet stream in its "tube-side" zone and discharge an effluent stream from its "tube-side" zone, each of said units connected, constructed, and arranged to receive a sweep fluid stream in its "shell-side" zone and discharge the sweep fluid and any permeate fluid from its "shell-side" zone, each fluid separation unit of said one stage provided with means for individually controlling the rates of flow of each sweep fluid stream in accordance with the differing characteristics of each unit, and provided with means for individually controlling the rates of flow of each effluent stream in accordance with the differing characteristics of each unit so that the composition of sweep fluid and permeate fluid discharged from each "shell-side" zone of each permeator unit is substantially the same composition.

26. The improved system of claim 25 in which said means for individually controlling said rates of flow are operative to maintain the effluent streams at substantially the same composition.

27. An improved multi-stage method for continuously progressively separating a permeable fluid from a fluid mixture according to the different permeation rates of the mixture components through a plurality of permeable membrane structures, said method comprising maintaining, in each of a plurality of operatively associated stages, a pluarity of permeable membrane structures of polymeric composition and comprising hollow filaments extending through and packed in a fluid-tight enclosed zone, said plurality of stages comprising a first stage and a final stage, said method further comprising passing an inlet stream of an initial fluid mixture at a given pressure through the interior of the hollow filaments extending through the enclosed zone of the first stage, removing any permeated fluid from said first stage enclosed zone outside said hollow filaments in a direction countercurrent to the direction of flow of said initial fluid mixture inside said hollow filaments in said first stage zone said method further comprising concurrently passing at least a portion of the permeated fluid from a preceding stage as an inlet stream to and through the enclosed zone of said final stage outside said hollow filaments in said final stage zone under a given pressure, withdrawing and collecting permeated fluid from the interior of the hollow filaments extending through said final stage zone at a lower pressure and countercurrently with respect to said inlet stream moving through said enclosed zone of said final stage, supplying the remaining portion of the said fluid which passes through said enclosed zone outside said hollow filaments of said final stage as a portion of an inlet fluid stream to at least one preceding stage.

28. An improved multi-stage method for continuously progressively separating a permeable fluid from a fluid mixture according to the different permeation rates of the mixture components through a plurality of permeable membrane elements, said method comprising maintaining, in each of a plurality of operatively associated stages, a plurality of permeable membrane elements of polymeric composition in the form of hollow filaments extending through and packed in a fluid-tight enclosed zone, said filaments maintained substantially parallel to each other in at least one closely packed bundle by a surrounding, flexible porous sheath member extending along said bundle, said plurality of stages comprising a first stage and a final stage, said method further comprising passing an inlet stream of an initial fluid mixture at a given pressure through the interior of the hollow filaments extending through the enclosed zone of the first stage, passing a sweep fluid at a lower pressure through the enclosed zone of said first stage, said sweep fluid passing outside of said hollow filaments extending through said first stage zone and countercurrently to the flow of said initial fluid mixture inside said hollow filaments in said first stage zone, said sweep fluid carrying away any permeated fluid and maintaining along said filaments a desired ratio of fluid component concentrations inside said filaments to those outside said filaments, said method further comprising concurrently passing at least a portion of the permeated fluid from a preceding stage as an inlet stream to and through the enclosed zone of said final stage outside said hollow filaments in said final stage zone under a given pressure, withdrawing and collecting permeated fluid from the interior of the hollow filaments extending through said final stage zone at a lower pressure and countercurrently with respect to said inlet stream moving through said enclosed zone of said final stage, supplying the remaining portion of the said fluid which passes through said enclosd zone outside said hollow filaments of said final stage as a portion of an inlet fluid stream to at least one preceding stage.

29. The improved method of claim 28 in which the rate of flow of the fluid passing from the enclosed zone outside the hollow filaments of a given stage other than the first stage is varied in accordance with the composition of the permeated fluid collected from the interior of the hollow filaments of said given stage in order to maintain a predetermined composition of the said permeated fluid collected from the interior of the given stage hollow filaments.

30. The improved method of claim 28 in which a portion of said initial mixture is used as the sweep fluid and the rate of flow of said sweep fluid is varied in accordance with the composition of the fluid passing from the hollow filaments of said first stage to maintain a predetermined degree of separation of the most permeable component of said mixture.

31. The improved method of claim 30 in which the rate of flow of the fluid passing from the enclosed zone outside the hollow filaments of a given stage other than the first stage is varied in accordance with the composition of the permeated fluid collected from the interior of the hollow filaments of said given stage in order to maintain a predetermined composition of the said permeated fluid collected from the interior of the given stage hollow filaments.

32. The improved method of claim 28 in which in at least one stage the inlet stream is moved in parallel through the hollow filaments in each of a plurality of enclosed zones corresponding to a plurality of separation units having differing fluid separation characteristics, and a portion of the inlet stream is concurrently moved in parallel as a sweep fluid at lower pressure through each of the plurality of enclosed zones of each unit to carry away any permeated fluid, and controlling the rates of flow of each inlet stream and each sweep fluid stream in accordance with the differing characteristics of each unit so that the composition of the sweep fluid stream and permeated fluid leaving each enclosed zone is substantially the same.

33. The improved method of claim 32 in which the rates of flow of each inlet stream and each sweep fluid stream are controlled to maintain the effluent streams at substantially the same composition.

34. An improved multi-stage method for continuously progressively separating a permeable fluid from a mixture of permeable fluids according to the different permeation rates of the mixture components through a plurality of permeable membrane elements, said method comprising maintaining, in each of a plurality of operatively associated stages, a plurality of permeable membrane elements of polymeric composition in the form of hollow filaments surrounded by a porous sleeve member, said filaments extending through and packed in a fluid-tight enclosed zone, said zone defined by a tubular casing assembly having a first end and a second end, each end being closed by a centrifugally cast wall member, said plurality of stages comprising a first stage and a final stage, said method further comprising passing an inlet stream of an initial fluid mixture at a given pressure through the interior of the hollow filaments extending through the enclosed zone of the first stage, passing a sweep fluid at a lower pressure through the enclosed zone of said first stage, said sweep fluid passing outside of said hollow filaments extending through said first stage zone and countercurrently to the flow of said initial fluid mixture inside said hollow filaments in said first stage zone, said sweep fluid carrying away any permeated fluid and maintaining along said filaments a desired ratio of fluid component concentrations inside said filaments to those outside said filaments, said method further comprising concurrently passing at least a portion of the permeated fluid from a preceding stage as an inlet stream to and through the enclosed zone of said final stage outside said hollow filaments in said final stage zone under a given pressure, withdrawing and collecting permeated fluid from the interior of the hollow filaments extending through said final stage zone at a lower pressure, supplying the remaining portion of the said fluid which passes through said enclosed zone outside said hollow filaments of said final stage as a portion of an inlet fluid stream to at least one preceding stage.

References Cited

UNITED STATES PATENTS

| | | | |
|---|---|---|---|
| 1,496,757 | 6/1924 | Lewis et al. | 55—16 |
| 3,019,853 | 2/1962 | Kohman et al. | 55—158 X |
| 3,198,335 | 8/1965 | Lewis et al. | 55—158 X |
| 3,228,877 | 1/1966 | Mahon | 210—321 X |
| 3,246,764 | 4/1966 | McCormack | 55—158 X |
| 3,262,251 | 7/1966 | Hicks | 55—158 |

REUBEN FRIEDMAN, *Primary Examiner.*

J. ADEE, *Assistant Examiner.*